US012583225B2

(12) United States Patent
Takabayashi

(10) Patent No.: US 12,583,225 B2
(45) Date of Patent: Mar. 24, 2026

(54) PRINTING APPARATUS

(71) Applicant: SEIKO EPSON CORPORATION, Tokyo (JP)

(72) Inventor: Kazunori Takabayashi, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 237 days.

(21) Appl. No.: 18/475,307

(22) Filed: Sep. 27, 2023

(65) Prior Publication Data

US 2024/0100836 A1 Mar. 28, 2024

(30) Foreign Application Priority Data

Sep. 27, 2022 (JP) ................................. 2022-153843

(51) Int. Cl.

*B41J 2/165* (2006.01)
*B41J 2/17* (2006.01)
*B41J 3/407* (2006.01)

(52) U.S. Cl.

CPC ....... *B41J 2/16547* (2013.01); *B41J 2/16526* (2013.01); *B41J 2/1721* (2013.01); *B41J 3/4078* (2013.01); *B41J 2002/16582* (2013.01)

(58) Field of Classification Search

CPC .................. B41J 2/16547; B41J 2/1721; B41J 2002/16582; B41J 2/16517

See application file for complete search history.

(56) References Cited

U.S. PATENT DOCUMENTS

| | | | | |
|---|---|---|---|---|
| 9,889,690 | B2 * | 2/2018 | Hayashi | B41J 29/13 |
| 10,166,798 | B2 * | 1/2019 | Hayashi | B41J 29/13 |
| 2004/0179047 | A1 | 9/2004 | Niimi | |
| 2004/0179081 | A1 | 9/2004 | Nimi et al. | |
| 2020/0290375 | A1 * | 9/2020 | Yamashita | B41J 29/023 |

FOREIGN PATENT DOCUMENTS

| | | | | | |
|---|---|---|---|---|---|
| JP | 2004-268506 | A | | 9/2004 | |
| JP | 2004-276319 | A | | 10/2004 | |
| JP | 2004291493 | A | * | 10/2004 | B41J 3/546 |
| JP | 7185830 | B2 | * | 12/2022 | B41J 11/20 |

* cited by examiner

*Primary Examiner* — Sharon Polk

(74) *Attorney, Agent, or Firm* — Dority & Manning, P.A.

(57) ABSTRACT

A printing apparatus includes a medium support unit having a support surface that supports at least a printing region of a medium, a medium accommodation unit configured to store a region of the medium that is not supported by the support surface, a head configured to eject a liquid onto the medium supported by the support surface, and a head moving unit configured to move the head. The medium support unit is configured not to move in a direction parallel to the support surface, and the head moving unit moves the head in a direction parallel to the support surface.

20 Claims, 17 Drawing Sheets

PRINTING APPARATUS

The present application is based on, and claims priority from JP Application Serial Number 2022-153843, filed Sep. 27, 2022, the disclosure of which is hereby incorporated by reference herein in its entirety.

BACKGROUND

1. Technical Field

The present disclosure relates to a printing apparatus.

2. Related Art

For example, JP-A-2004-276319 discloses a printing apparatus that performs printing on a medium such as a T-shirt. In such a printing apparatus, it is possible to move the medium from the outside of a housing to the inside of the housing by moving a platen (tray), on which the medium is placed, in the horizontal direction, after the medium is placed on a support surface of the platen on the outside of the housing. With this configuration, after the medium is placed on the support surface on the outside of the housing, it is possible to perform the printing on the medium that has been moved from the outside of the housing to the inside of the housing.

However, in such a printing apparatus, it is necessary to move the platen to the outside of the housing in order to place the medium thereon. Thus, a mechanism for moving the platen to the outside of the housing in a stable manner is required, which leads to an increase in the size of the printing apparatus, and it is desired to reduce the size of the printing apparatus.

SUMMARY

A printing apparatus for solving the above-described problem includes a medium support unit having a support surface supporting at least a printing region of a medium, a medium accommodation unit configured to accommodate a region, of the medium, not supported by the support surface, a head configured to eject a liquid onto the medium supported by the support surface, and a head moving unit configured to move the head. The medium support unit is configured not to move in a direction parallel to the support surface, and the head moving unit moves the head in a direction parallel to the support surface.

DESCRIPTION OF EMBODIMENTS

First Embodiment

An embodiment of a printing apparatus will be described below. In the following description, a direction intersecting (for example, orthogonal to) a vertical direction Z is referred to as a width direction X, and a direction intersecting the vertical direction Z and the width direction X is referred to as a front-rear direction Y. One side in the width direction X is referred to as a first width direction X1, and the other side in the width direction X is referred to as a second width direction X2. One side in the front-rear direction Y is referred to as a front side Y1, and the other side in the front-rear direction Y is referred to as a rear side Y2. The upper side in the vertical direction Z is referred to as an upper side Z1, and the lower side in the vertical direction Z is referred to as a lower side Z2. The width direction X corresponds to an example of a first direction. The front-rear direction Y corresponds to an example of a second direction. The vertical direction Z corresponds to an example of an intersecting direction.

Printing Apparatus 10

Figure 1:
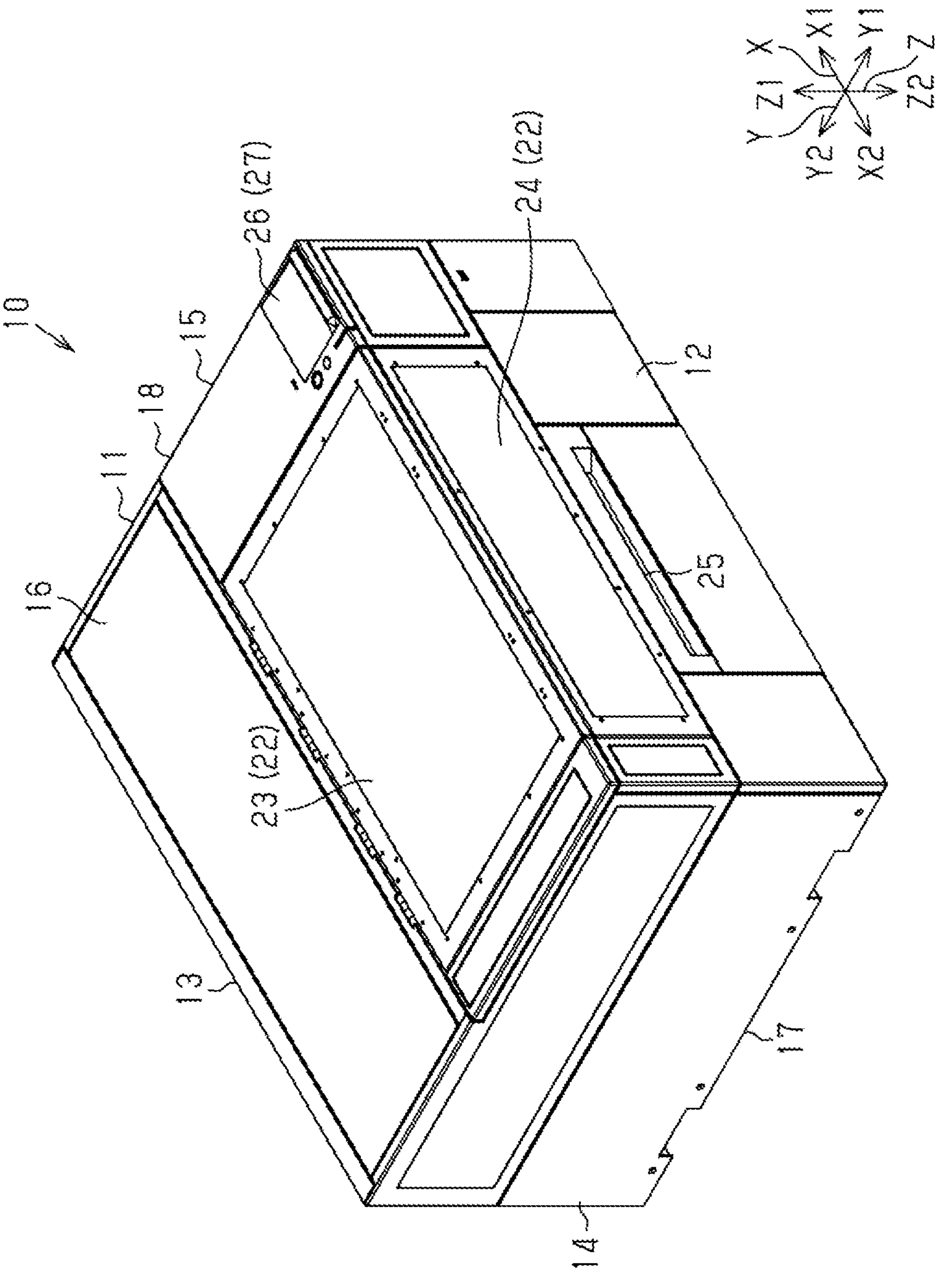
FIG. 1 is a perspective view illustrating a printing apparatus in a state in which the cover is closed.

A printing apparatus 10 is configured to perform printing on a medium, as illustrated in FIG. 1. The printing apparatus 10 may be configured to perform the printing on a medium by ejecting a liquid. The printing apparatus 10 may be configured to perform the printing on a flexible medium, such as a T-shirt. The printing apparatus 10 may be configured such that a medium is placed in the interior thereof by a user.

Housing 11

The printing apparatus 10 is provided with a housing 11. The housing 11 may have a rectangular shape. The housing 11 is provided with a front surface 12 facing the front side Y1. The housing 11 is provided with a back surface 13 facing the rear side Y2. The housing 11 is provided with a left side surface 14 facing the second width direction X2. The housing 11 is provided with a right side surface 15 facing the first width direction X1. The housing 11 is provided with a top surface 16 facing the upper side Z1. The housing 11 is provided with a bottom surface 17 facing the lower side Z2. The back surface 13 is a surface parallel to the front surface 12. The top surface 16 is a surface intersecting the front surface 12 and the back surface 13. The top surface 16 corresponds to an example of a first surface. The front surface 12 corresponds to an example of a second surface. The back surface 13 corresponds to an example of a third surface.

Figure 2:
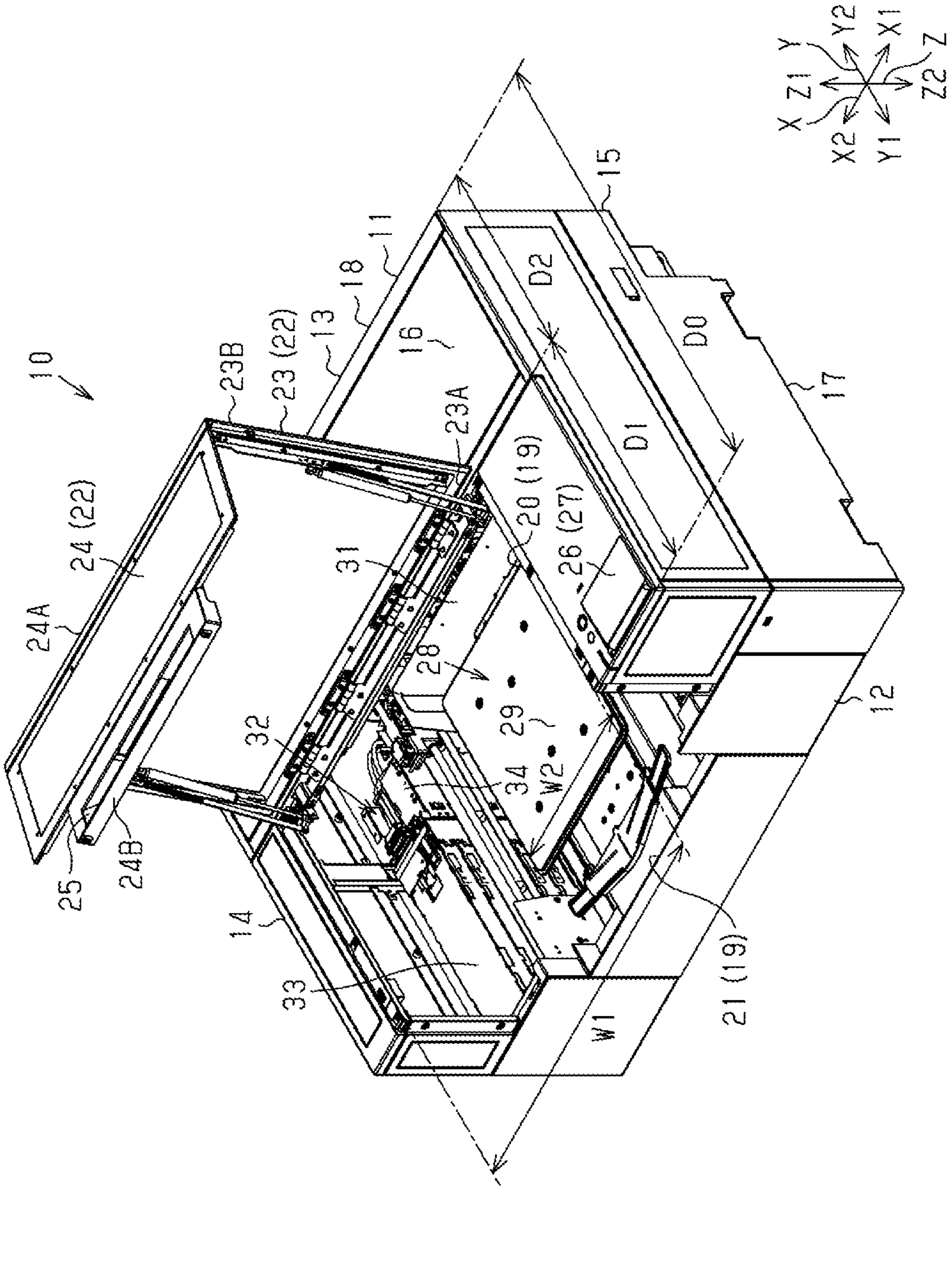
FIG. 2 is a perspective view illustrating the printing apparatus in a state in which the cover is opened.
Figure 3:
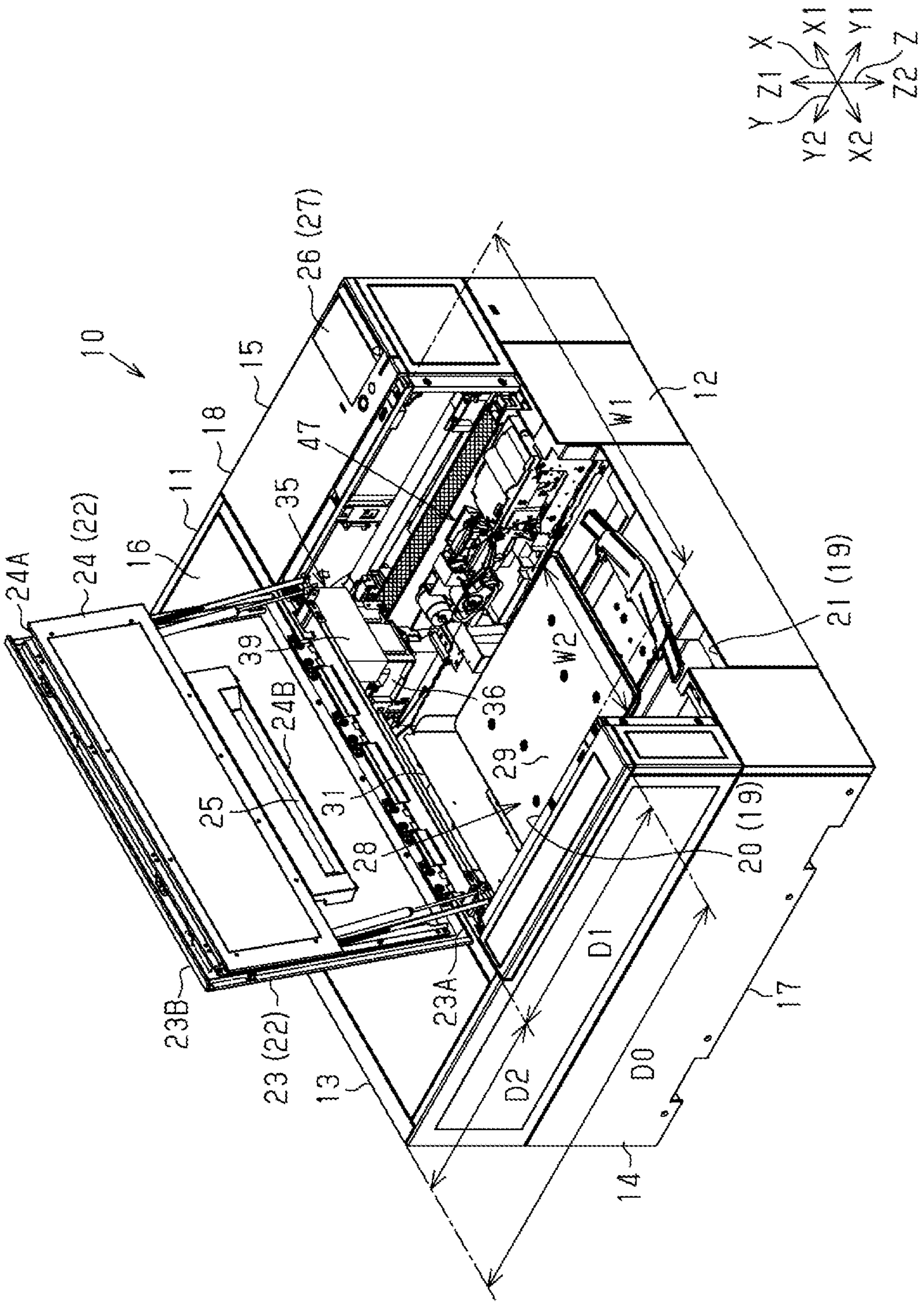
FIG. 3 is a perspective view illustrating the printing apparatus and housing configured to accommodate various members included in the printing apparatus.

As illustrated in FIG. 2 and FIG. 3, the housing 11 is configured to accommodate various members included in the printing apparatus 10. In particular, the housing 11 accommodates a medium support unit 28, a liquid supply unit 32, a printing unit 35, and a maintenance unit 47, which will be described later.

The housing 11 is provided with a housing frame 18. The housing frame 18 constitutes an exterior of the housing 11. The housing frame 18 is provided with an opening 19. That is, the housing 11 is provided with the opening 19. The opening 19 is configured to expose the various members accommodated in the housing 11. In particular, the opening 19 is configured to expose a support surface 29 of the medium support unit 28 to be described below.

The opening 19 is provided with a first opening 20 and a second opening 21. The first opening 20 is provided at the top surface 16. The second opening 21 is provided at the front surface 12. The first opening 20 and the second opening 21 are provided so as to be continuous with each other. That is, the opening 19 is provided across the top surface 16 and the front surface 12.

Figure 4:
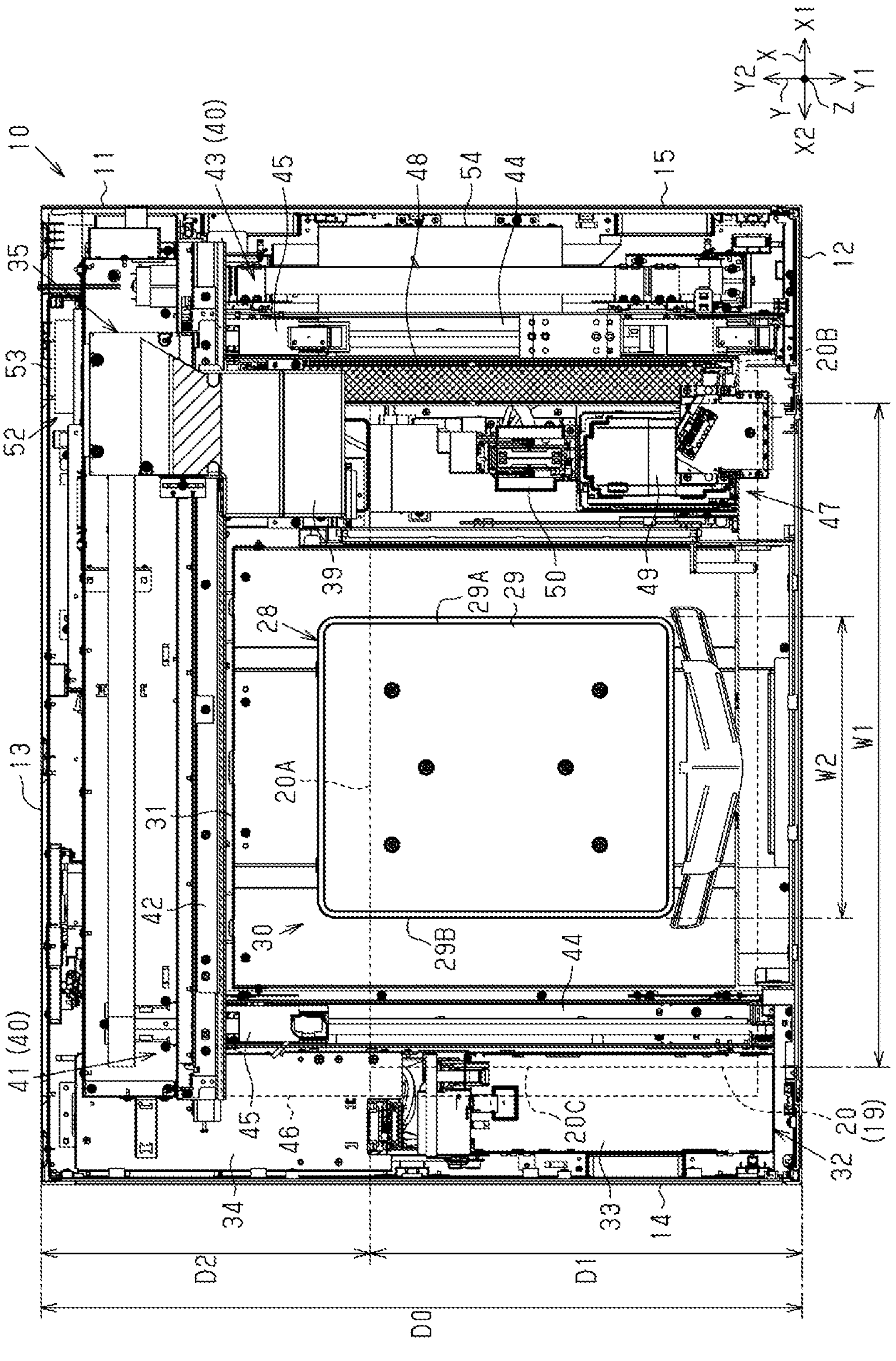
FIG. 4 is a top surface view illustrating the printing apparatus and the medium support unit.

As illustrated in FIG. 4, in plan view, the first opening 20 is open between the front surface 12 and a first position 20A in the front-rear direction Y. The first position 20A is a position separated from the front surface 12 to the rear side Y2 by a first distance D1. The first position 20A is a position separated from the back surface 13 by a second distance D2. The first distance D1 is longer than the second distance D2. In other words, the first position 20A is closer to the back surface 13 than to the front surface 12 in the front-rear direction Y. When a distance between the front surface 12 and the back surface 13 in the front-rear direction Y is denoted by DO, the first distance D1 is longer than half of the distance DO.

In plan view, the first opening 20 is open between a second position 20B and a third position 20C in the width direction X. In plan view, the first opening 20 is open over a first width W1 in the width direction X. The first width W1 is longer than a second width W2 of the support surface 29. In this way, when viewed from the upper side Z1, the first opening 20 has a rectangular shape longer than the support surface 29 in the width direction X.

In particular, when viewed from the upper side Z1, the second position 20B is located further to the first width direction X1 side than a first side end 29A of the support surface 29. The first side end 29A is an end of the support surface 29 in the first width direction X1. When viewed from the upper side Z1, the third position 20C is located further to the second width direction X2 side than a second side end 29B of the support surface 29. The second side end 29B is an end of the support surface 29 in the second width direction X2. As described above, when viewed from the upper side Z1, the first opening 20 is open to positions on the outside of the first side end 29A and the second side end 29B in the width direction X.

As illustrated in FIG. 2 and FIG. 3, the housing 11 is provided with an opening/closing cover 22. The opening/closing cover 22 can open and close the opening 19. The opening/closing cover 22 may be constituted by a sheet metal to secure rigidity. The opening/closing cover 22 is provided with a first opening/closing cover 23. The first opening/closing cover 23 has a flat plate shape. The first opening/closing cover 23 can open and close the first opening 20.

The opening/closing cover 22 is provided with a second opening/closing cover 24. The second opening/closing cover 24 has a flat plate shape. The second opening/closing cover 24 can open and close the second opening 21. The second opening/closing cover 24 is provided with a grip portion 25. The grip portion 25 can be gripped by the user. The grip portion 25 is provided on a second end 24B of the second opening/closing cover 24 to be described later.

The printing apparatus 10 is provided with a display unit 26 and an operation unit 27. The display unit 26 is configured to display information. The operation unit 27 is configured to be operable by the user. The display unit 26 and the operation unit 27 may be integrally configured as a touch panel, or may be separately configured. The display unit 26 and the operation unit 27 are provided on the top surface 16, but are not limited thereto.

Medium Support Unit 28

Figure 5:
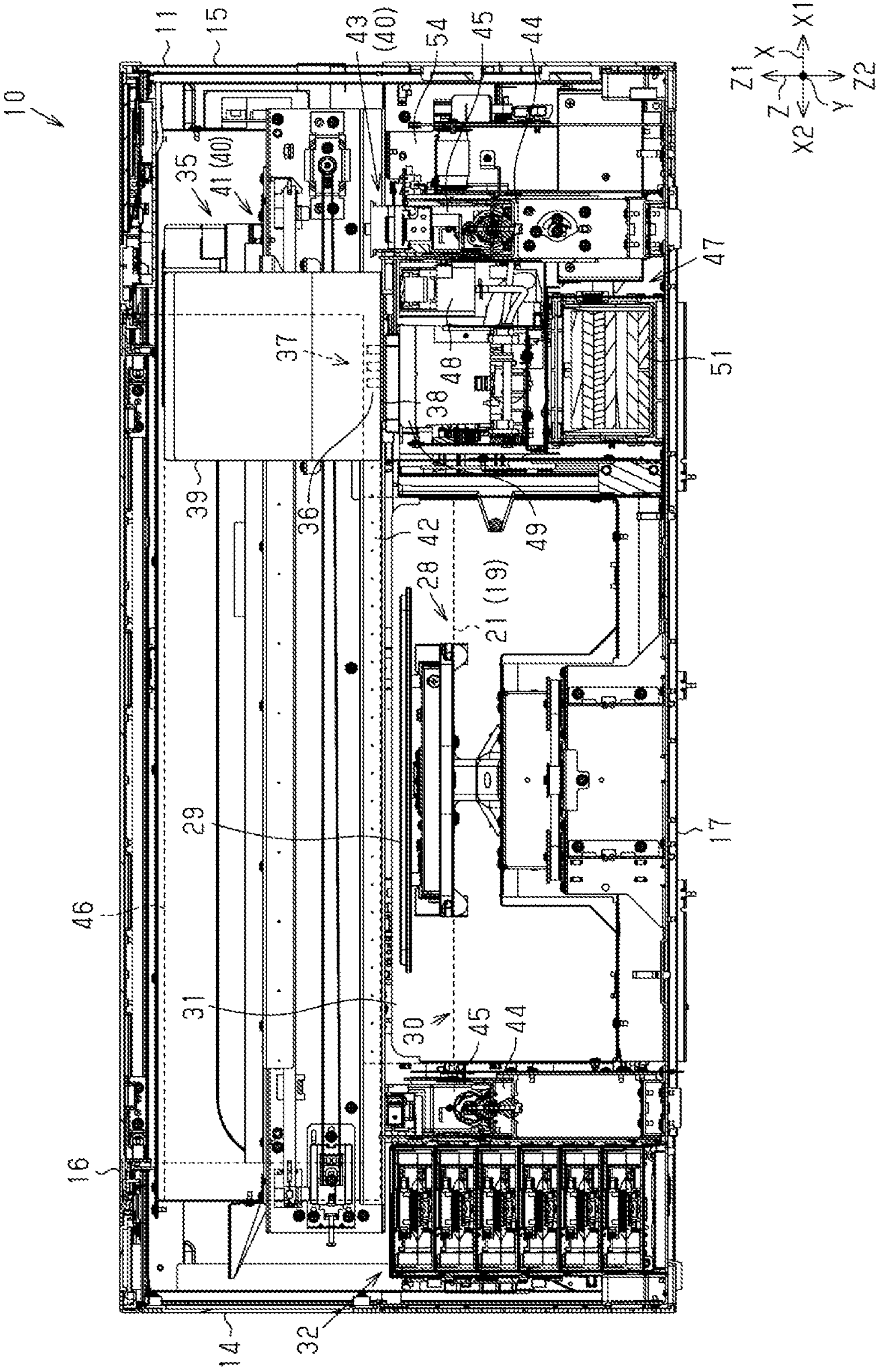
FIG. 5 is a top surface view illustrating the printing apparatus and the maintenance unit.

As illustrated in FIG. 4 and FIG. 5, the printing apparatus 10 is provided with the medium support unit 28. The medium support unit 28 is configured to support the medium. The medium support unit 28 includes the support surface 29. The support surface 29 is a surface facing the upper side Z1. The support surface 29 is configured to support the medium. In particular, the support surface 29 is the surface that supports at least the printing region of the medium. The support surface 29 can also be referred to as a placement surface on which the medium can be placed. As described above, the support surface 29 is the surface facing a direction intersecting the front surface 12 and parallel to the top surface 16.

The medium support unit 28 is configured not to move in the horizontal direction parallel to the support surface 29. In other words, the support surface 29 is configured not to move in the horizontal direction. The medium support unit 28 can adjust the position of the support surface 29 in the vertical direction Z.

The printing apparatus 10 is provided with a medium accommodation unit 30. The medium accommodation unit 30 is housed in the housing 11. The medium accommodation unit 30 is provided in at least the width direction X of the support surface 29, and may also be provided in the front-rear direction Y. When a partial region of the medium is supported by the support surface 29, the medium accommodation unit 30 can accommodate a partial region of the medium that is not supported by the support surface 29.

In particular, the medium accommodation unit 30 is provided with an accommodation tray 31. The medium accommodation unit 30 includes regions partitioned by the accommodation tray 31. The accommodation tray 31 may define the medium accommodation unit 30 at least at the rear side Y2 of the support surface 29.

Liquid Supply Unit 32

The printing apparatus 10 is provided with the liquid supply unit 32. The liquid supply unit 32 is provided further in the second width direction X2 than the medium support unit 28 and the medium accommodation unit 30. The liquid supply unit 32 may be provided along an inner wall surface of the left side surface 14. The liquid supply unit 32 is configured to supply the liquid to a head 36 to be described below.

The liquid supply unit 32 is provided with a liquid storage unit 33 and a liquid supply driving unit 34. The liquid storage unit 33 is configured to store the liquid supplied to the head 36. The liquid storage unit 33 may be a detachable cartridge, or may be a tank that can be replenished with the liquid. The top surface of the liquid storage unit 33 may be a flat surface.

The liquid supply driving unit 34 is driven to supply the liquid stored in the liquid storage unit 33 to the head 36. The liquid supply driving unit 34 may include a liquid supply pump. The top surface of the liquid supply driving unit 34 may be a flat surface.

Printing Unit 35

The printing apparatus 10 is provided with the printing unit 35. The printing unit 35 is configured to perform printing on the medium. In particular, the printing unit 35 is configured to perform the printing on the medium supported by the support surface 29.

The printing unit 35 is provided with the head 36. The head 36 can eject the liquid onto the medium supported by the support surface 29. The head 36 is provided with a plurality of nozzles 37 and a nozzle surface 38. The nozzle surface 38 is a surface facing the lower side Z2. The nozzle surface 38 is a surface at which each of the plurality of nozzles 37 opens. Each of the plurality of nozzles 37 can eject the liquid.

The printing unit 35 is provided with a carriage 39. The carriage 39 is configured to support the head 36. The head 36 is configured as a serial type, but may be configured as a line type. In the serial type, the printing is performed while the head 36 moves in the width direction X. In the line type, the head 36 is provided over the width direction X.

The printing unit 35 is provided with a head moving unit 40. The head moving unit 40 is configured to move the carriage 39. In other words, the head moving unit 40 is configured to move the head 36. The head moving unit 40 is configured to move the head 36 in the horizontal direction. Specifically, the head moving unit 40 is configured to move the head 36 in the width direction X and the front-rear direction Y.

The head moving unit 40 is provided with a first head moving unit 41. The first head moving unit 41 is configured to move the carriage 39 in the width direction X. In other words, the first head moving unit 41 is configured to move the head 36 in the width direction X.

The first head moving unit 41 is provided with a first guide portion 42. The first guide portion 42 is configured to extend in the width direction X over the support surface 29. The first guide portion 42 guides the carriage 39 so as to be movable along the width direction X.

The head moving unit 40 is provided with a second head moving unit 43. The second head moving unit 43 is configured to support the first head moving unit 41. The second head moving unit 43 is configured to move the first head moving unit 41 in the front-rear direction Y. In other words, the second head moving unit 43 is configured to move the head 36 in the front-rear direction Y. When the head 36 is the line type, the head moving unit 40 need not necessarily be provided with the first head moving unit 41 and may be provided with only the second head moving unit 43.

The second head moving unit 43 is provided with a pair of second guide portions 44. The pair of second guide portions 44 are provided in the first width direction X1 and the second width direction X2 of the medium support unit 28, with the medium support unit 28 interposed therebetween. Each of the pair of second guide portions 44 is configured to extend in the front-rear direction Y.

The second head moving unit 43 is provided with a pair of support portions 45. The pair of support portions 45 are provided in the first width direction X1 and the second width direction X2 of the medium support unit 28, with the medium support unit 28 interposed therebetween. Each of the pair of support portions 45 is configured to support the first head moving unit 41. The pair of support portions 45 are movable in the front-rear direction Y along the corresponding pair of second guide portions 44. In this manner, the head moving unit 40 carries the head 36, and is movable in the horizontal direction over the medium support unit 28. The head moving unit 40 is configured in a gate shape in a front view.

The head moving unit 40 can move the head 36 within a movement range 46. The movement range 46 of the head 36 includes a facing position and retracted positions. The facing position is a position at which the nozzle surface 38 faces the support surface 29. The retracted positions are positions at which the nozzle surface 38 does not face the support surface 29. The retracted positions include a standby position. The standby position is a position at which the head 36 is disposed when the printing is not performed. The standby position may be positioned on the first width direction X1 side and the rear side Y2 side in the movement range 46. Further, the retracted positions include a maintenance position. The maintenance position is a position at which the nozzle surface 38 faces the maintenance unit 47 to be described later. In other words, the movement range 46 of the head 36 includes the maintenance position.

Maintenance Unit 47

The printing apparatus 10 is provided with the maintenance unit 47. The maintenance unit 47 is provided further in the first width direction X1 in than the medium support unit 28 and the medium accommodation unit 30. The maintenance unit 47 is disposed at a position that does not overlap the medium support unit 28 and the medium accommodation unit 30 in the vertical direction Z. The maintenance unit 47 is configured to perform maintenance of the head 36.

As illustrated in FIG. 4, the maintenance unit 47 is provided with a flushing portion 48. The flushing portion 48 is configured to receive the liquid ejected from the head 36. The flushing portion 48 is configured to extend in the front-rear direction Y. The flushing portion 48 is disposed at a position that does not overlap the medium support unit 28 and the medium accommodation unit 30 in the vertical direction Z.

The maintenance unit 47 is provided with a wiping portion 49. The wiping portion 49 can wipe the nozzle surface 38. The wiping portion 49 is disposed at a position that does not overlap the medium support unit 28 and the medium accommodation unit 30 in the vertical direction Z.

The maintenance unit 47 is provided with a suction portion 50. The suction portion 50 is configured to suck the liquid from the head 36. The suction portion 50 may be provided with a suction pump that sucks the liquid from the head 36. The suction portion 50 is disposed at a position that does not overlap the medium support unit 28 and the medium accommodation unit 30 in the vertical direction Z.

As illustrated in FIG. 5, the maintenance unit 47 is provided with a waste liquid tank 51. The waste liquid tank 51 is configured to store the liquid received by the flushing portion 48. The waste liquid tank 51 is configured to store the liquid sucked by the suction portion 50. The waste liquid tank 51 is disposed at a position that does not overlap the medium support unit 28 and the medium accommodation unit 30 in the vertical direction Z. The waste liquid tank 51 is disposed at a position overlapping with the flushing portion 48 in the vertical direction Z. The waste liquid tank 51 is disposed at a position overlapping with the wiping portion 49 in the vertical direction Z. The waste liquid tank 51 is disposed at a position overlapping with the suction portion 50 in the vertical direction Z.

Control Board 52 and Power Supply Unit 54

As illustrated in FIG. 4, the printing apparatus 10 is provided with a control board 52. The control board 52 is accommodated in the housing 11. The control board 52 may be provided along the inner wall surface of the back surface 13. The control board 52 is a board on which various electronic components for controlling the printing apparatus 10 are mounted.

The control board 52 is provided with a control unit 53. The control unit 53 controls the printing apparatus 10. The control unit 53 controls various operations executed by the printing apparatus 10. The control unit 53 may be configured as a circuit including a: one or more processors that perform various processes according to a computer program, one or more dedicated hardware circuits that perform at least some of the various processes, or y: a combination thereof. The hardware circuit is, for example, an application-specific integrated circuit. A processor includes a CPU and a memory such as a RAM and a ROM which stores program code or instructions configured to cause the CPU to perform processes. The memory, that is, a computer-readable medium, includes any readable medium that can be accessed by a general purpose or special purpose computer.

The printing apparatus 10 is provided with a power supply unit 54. The power supply unit 54 is accommodated in the housing 11. The power supply unit 54 may be provided along the inner wall surface of the right side surface 15. The power supply unit 54 is configured to supply power to the printing apparatus 10.

Electrical Configuration of Printing Apparatus 10

Next, the electrical configuration of the printing apparatus 10 will be described with reference to FIG. 6.

Figure 6:
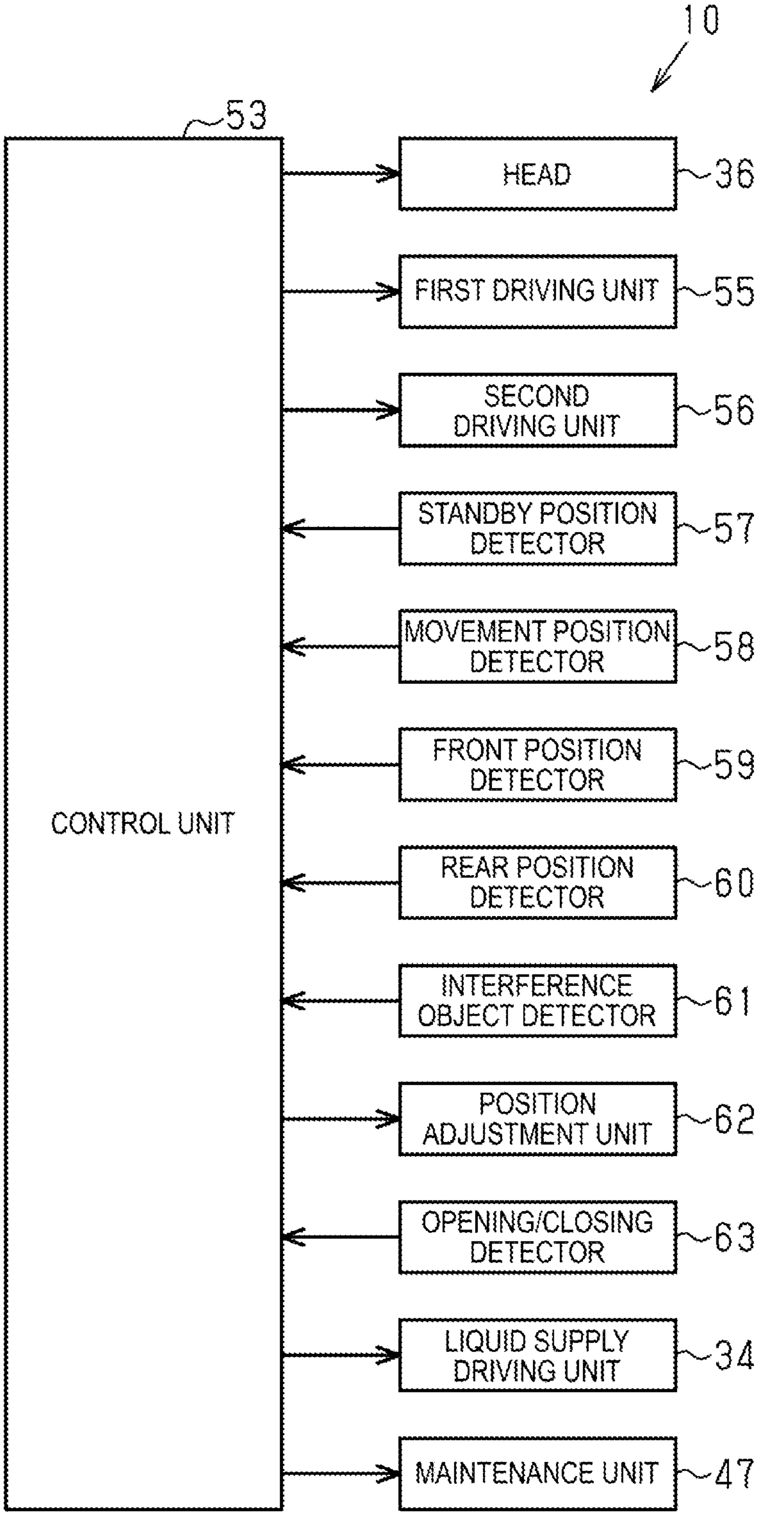
FIG. 6 is a block diagram illustrating an electrical configuration of the printing apparatus.

As illustrated in FIG. 6, the printing apparatus 10 is provided with a first driving unit 55. The first driving unit 55 is a driving source that moves the carriage 39 along the width direction X. The first driving unit 55 may be provided at the first head moving unit 41.

The printing apparatus 10 is provided with a second driving unit 56. The second driving unit 56 is a driving source that moves the first head moving unit 41 along the front-rear direction Y. The second driving unit 56 may be provided at the second head moving unit 43.

The printing apparatus 10 is provided with a standby position detector 57. The standby position detector 57 can detect that the head 36 is disposed at the standby position. The standby position detector 57 may be provided at the first head moving unit 41.

The printing apparatus 10 is provided with a movement position detector 58. The movement position detector 58 can detect the position at which the head 36 moving in the width direction X is disposed. The movement position detector 58 may be provided at the first head moving unit 41.

The printing apparatus 10 is provided with a front position detector 59. The front position detector 59 can detect that the head 36 is disposed at a front-most position. The front position detector 59 may be provided at the second head moving unit 43.

The printing apparatus 10 is provided with a rear position detector 60. The rear position detector 60 can detect that the head 36 is disposed at a rear-most position. The rear position detector 60 may be provided in the second head moving unit 43.

The printing apparatus 10 is provided with an interference object detector 61. The interference detector 61 can detect an object of interference with the head 36. The interference object detector 61 may be provided in the second head moving unit 43. The interference object detector 61 may be provided with a light projecting portion and a light receiving portion (not illustrated). The light projecting portion and the light receiving portion are provided in the pair of second guide portions 44.

The printing apparatus 10 is provided with a position adjustment unit 62. The position adjustment unit 62 is configured to adjust the position of the support surface 29 in the vertical direction Z. The position adjustment unit 62 may be provided in the medium support unit 28. The position adjustment unit 62 may be configured to adjust the position of the accommodation tray 31 in the vertical direction Z.

The printing apparatus 10 is provided with an opening/closing detector 63. The opening/closing detector 63 can detect an opening/closing state of the first opening/closing cover 23. That is, the opening/closing detector 63 can detect the opening/closing state of the opening/closing cover 22. The opening/closing detector 63 is provided on the inner wall surface of the top surface 16, but is not limited thereto.

The control unit 53 is coupled to the head 36, the first driving unit 55, the second driving unit 56, the position adjustment unit 62, the liquid supply driving unit 34, and the maintenance unit 47. The control unit 53 supplies drive signals to control the head 36, the first driving unit 55, the second driving unit 56, the position adjustment unit 62, the liquid supply driving unit 34, and the maintenance unit 47.

The control unit 53 is coupled to the standby position detector 57, the movement position detector 58, the front position detector 59, the rear position detector 60, the interference object detector 61, and the opening/closing detector 63. The control unit 53 can receive detection signals from the standby position detector 57, the movement position detector 58, the front position detector 59, the rear position detector 60, the interference object detector 61, and the opening/closing detector 63.

The control unit 53 performs various types of control based on the detection signals. As a specific example, the control unit 53 may stop the printing when the opening/closing detector 63 detects that the opening/closing cover 22 is opened while the printing is being performed.

Detailed Configuration of Housing 11

Here, a detailed configuration of the housing 11 will be described.

Figure 7:
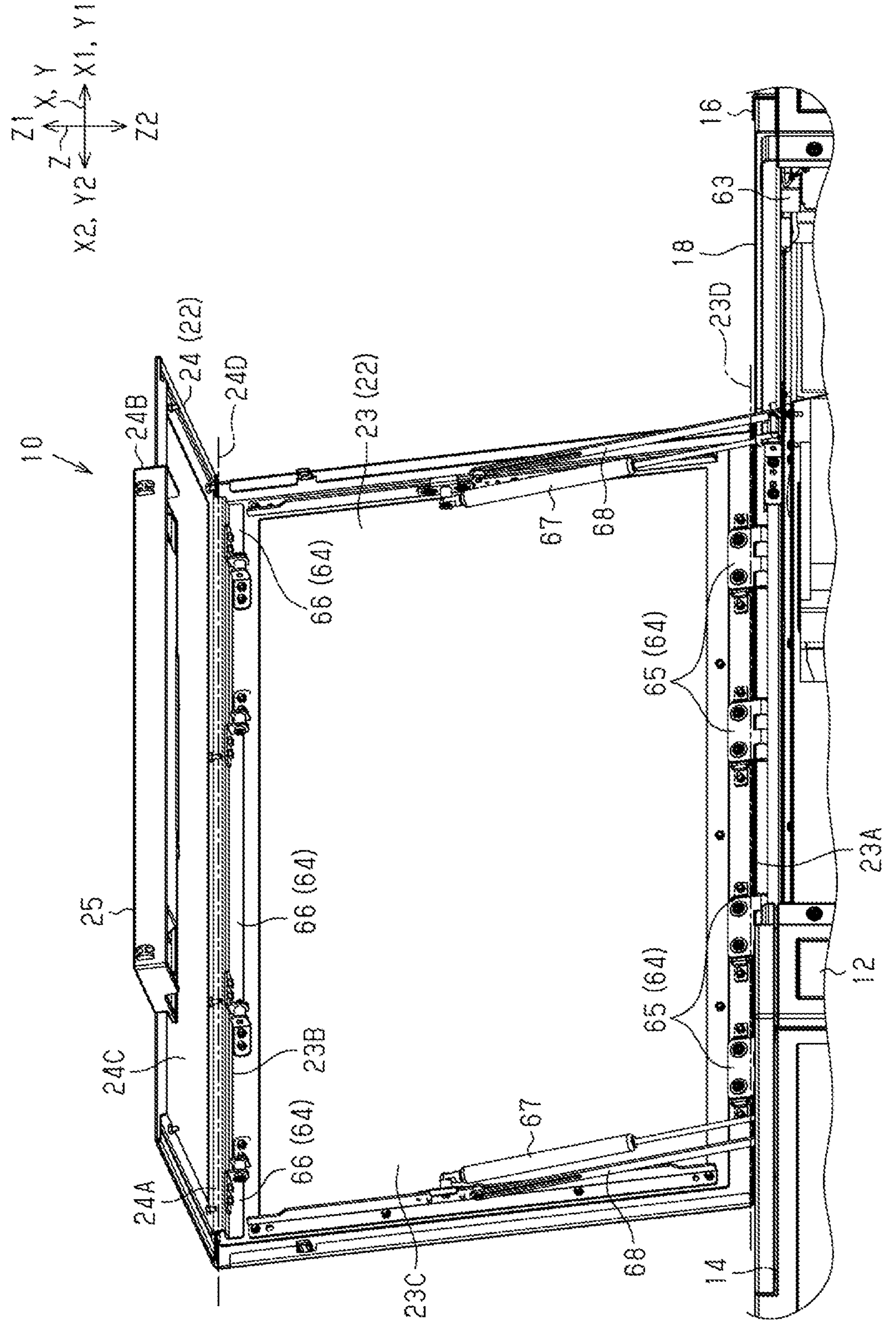
FIG. 7 is a perspective view illustrating the printing apparatus and a coupling portion.
Figure 8:
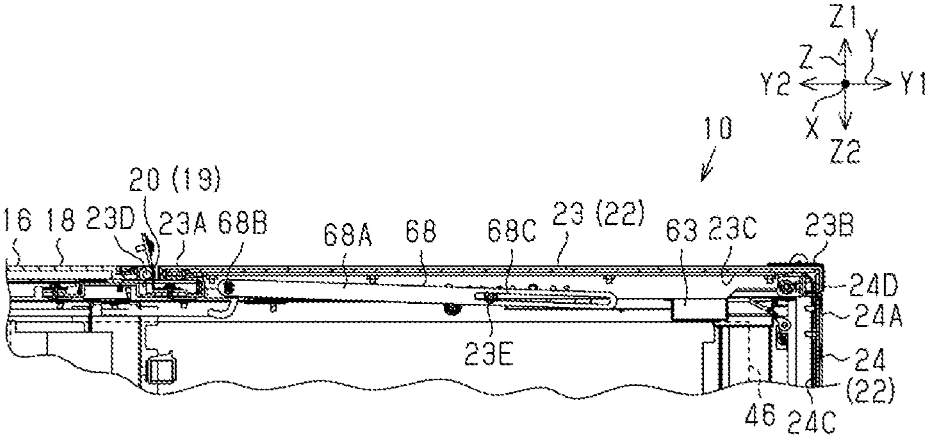
FIG. 8 is a cross-sectional view illustrating an opening/closing cover when the opening is closed.
Figure 9:
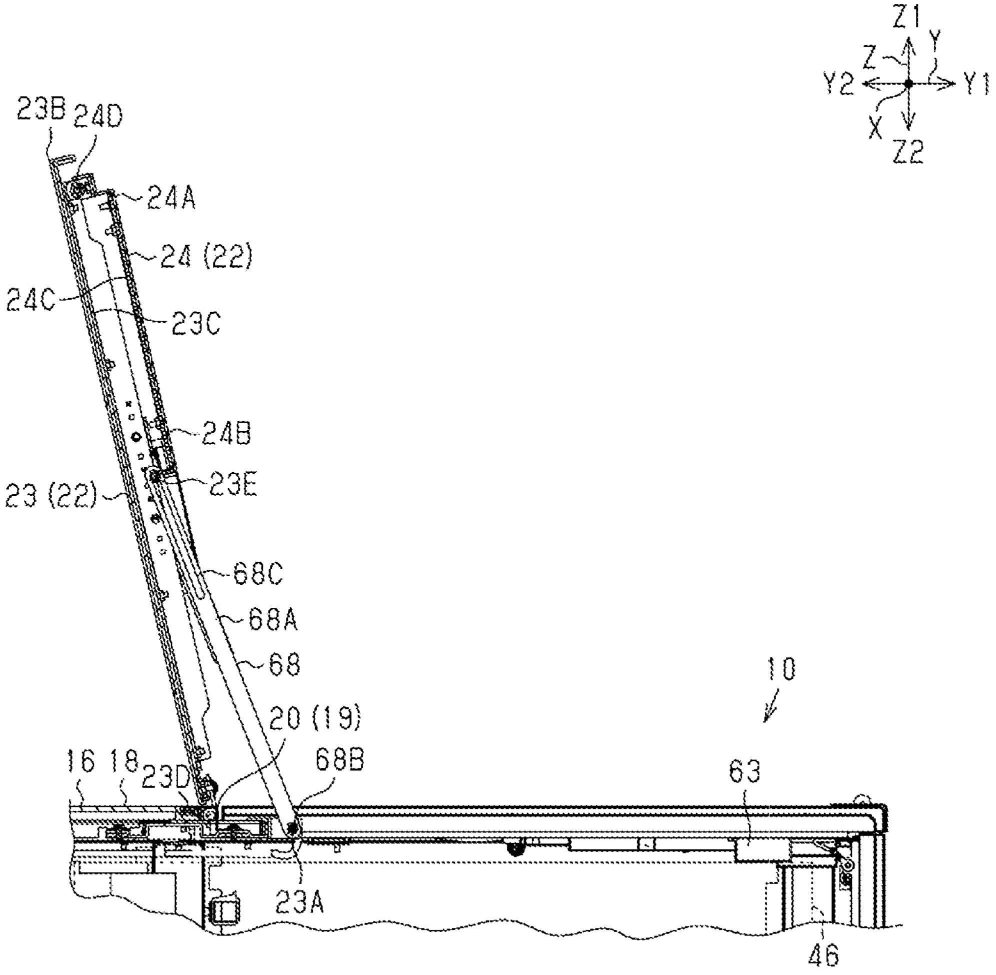
FIG. 9 is a cross-sectional view illustrating the opening/closing cover in an open state.

As illustrated in FIG. 7 to FIG. 9, the first opening/closing cover 23 includes a first end 23A and a second end 23B. The first end 23A is an end positioned to the rear side Y2 of the first opening/closing cover 23, when the first opening 20 is closed by the first opening/closing cover 23. The second end 23B is an end positioned to the front side Y1 of the first opening/closing cover 23, when the first opening 20 is closed by the first opening/closing cover 23.

The first opening/closing cover 23 includes an inner surface 23C. The inner surface 23C is a surface facing the inside of the printing apparatus 10, when the first opening 20 is closed by the first opening/closing cover 23. In other words, the inner surface 23C is a surface facing the lower side Z2, when the first opening 20 is closed by the first opening/closing cover 23.

The second opening/closing cover 24 includes a first end 24A and a second end 24B. The first end 24A is an end positioned on the upper side Z1 of the second opening/closing cover 24, when the second opening 21 is closed by the second opening/closing cover 24. The second end 24B is an end positioned at the lower side Z2 of the second opening/closing cover 24, when the second opening 21 is closed by the second opening/closing cover 24.

The second opening/closing cover 24 includes an inner surface 24C. The inner surface 24C is a surface facing the inside of the printing apparatus 10, when the second opening 21 is closed by the second opening/closing cover 24. In other words, the inner surface 24C is a surface facing the rear side Y2, when the second opening 21 is closed by the second opening/closing cover 24.

As illustrated in FIG. 7, the printing apparatus 10 is provided with a coupling portion 64. The coupling portion 64 is configured to couple the respective members constituting the housing 11. The coupling portion 64 is provided with a first coupling portion 65. The first coupling portion 65 is configured to couple the housing frame 18 and the first opening/closing cover 23. The first coupling portion 65 may be a rotary hinge. The coupling portion 64 is provided with a second coupling portion 66. The second coupling portion 66 is configured to couple the first opening/closing cover 23 and the second opening/closing cover 24. The second coupling portion 66 may be a folding hinge.

The first end 23A of the first opening/closing cover 23 is coupled to the housing frame 18 at the top surface 16 by the first coupling portion 65. That is, the first opening/closing cover 23 is coupled to the top surface 16 by the first coupling portion 65.

The first opening/closing cover 23 is coupled to the housing frame 18 so as to be rotatable about a first shaft 23D. The first shaft 23D extends along the width direction X. In this manner, the first coupling portion 65 couples the top surface 16 and the first end 23A of the first opening/closing cover 23 such that the first opening/closing cover 23 is rotatable about the first shaft 23D with respect to the top surface 16. The first shaft 23D is positioned at an end of the top surface 16 on the rear side Y2 at which the first opening 20 is formed. Therefore, the first shaft 23D is provided at a position closer to the back surface 13 than to the front surface 12. The first opening 20 is open between the front surface 12 and the first shaft 23D in the front-rear direction Y.

The first end 24A of the second opening/closing cover 24 is coupled to the second end 23B of the first opening/closing cover 23 by the second coupling portion 66. That is, the second opening/closing cover 24 is coupled to the first opening/closing cover 23 by the second coupling portion 66.

The second opening/closing cover 24 is coupled to the first opening/closing cover 23 so as to be rotatable about a second shaft 24D. The second shaft 24D extends along the width direction X. In this way, the second coupling portion 66 couples the second end 23B of the first opening/closing cover 23 and the first end 24A of the second opening/closing cover 24 such that the second opening/closing cover 24 is rotatable about the second shaft 24D. Further, the opening/closing cover 22 can be folded so that the inner surface 23C of the first opening/closing cover 23 and the inner surface 24C of the second opening/closing cover 24 surface face each other when opening the opening 19.

The printing apparatus 10 is provided with gas springs 67. The gas spring 67 is coupled to the housing frame 18 and the first opening/closing cover 23. The gas springs 67 are provided along both ends of the first opening/closing cover 23 in the width direction X. The gas spring 67 adjusts an opening/closing operation of the first opening/closing cover 23. The gas spring 67 applies a force in a direction in which the first opening/closing cover 23 is opened. Specifically, the gas spring 67 is configured to assist an opening operation of the first opening/closing cover 23. The gas spring 67 is configured to ease a closing operation of the first opening/closing cover 23.

The printing apparatus 10 is provided with slide support portions 68. The slide support portion 68 is coupled to the housing frame 18 and the first opening/closing cover 23. The slide support portions 68 are provided along both ends of the first opening/closing cover 23 in the width direction X. The slide support portion 68 is configured to slidably support the first opening/closing cover 23 in accordance with the opening/closing operation of the first opening/closing cover 23.

As illustrated in FIG. 8, the slide support portion 68 is provided with a support main body portion 68A. The support main body portion 68A has a flat plate shape extending in a longitudinal direction. The support main body portion 68A is pivotally attached to the housing frame 18 so as to be rotatable about a shaft 68B extending in the width direction X. The shaft 68B is positioned at one end of the support main body portion 68A.

The support main body portion 68A is provided with an elongated hole 68C. The elongated hole 68C is provided in the support main body portion 68A along the longitudinal direction of the support main body portion 68A. The elongated hole 68C is positioned at the other end of the support main body portion 68A. A protruding portion 23E is inserted through the elongated hole 68C. The protruding portion 23E is constituted by a pair of members, and is provided so as to protrude in both the first width direction X1 and the second width direction X2, in the first opening/closing cover 23.

When the first opening 20 is closed by the first opening/closing cover 23, the slide support portion 68 is disposed along the inner surface 23C of the first opening/closing cover 23. As a result, the slide support portion 68 is positioned further to the upper side Z1 than the movement range 46 of the head 36, and can be disposed outside the movement range 46 of the head 36. The gas spring 67 is also arranged along the inner surface 23C of the first opening/closing cover 23, in the same manner as the slide support portion 68.

As illustrated in FIG. 9, of the first opening/closing cover 23, the first opening 20 is caused to be in an open state as a result of the protruding portion 23E sliding along the elongated hole 68C. In this way, the slide support portion 68 guides the opening/closing operation of the first opening/closing cover 23. As a result of being supported by the slide support portion 68, the first opening/closing cover 23 can move to a predetermined angle with respect to the top surface 16.

Figure 10:
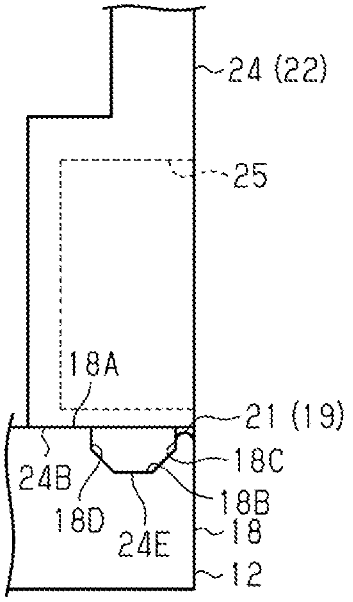
FIG. 10 is a cross-sectional view illustrating the opening/closing cover and an engaging portion.

As illustrated in FIG. 10, the second opening/closing cover 24 is provided with an engaging portion 24E. The engaging portion 24E is provided at the second end 24B of the second opening/closing cover 24. The engaging portion 24E is configured to protrude to the lower side Z2, in the state in which the second opening 21 is closed by the second opening/closing cover 24. The engaging portion 24E is engaged with the housing frame 18 at the front surface 12 in the state in which the second opening 21 is closed by the second opening/closing cover 24. That is, the engaging portion 24E is engaged with the front surface 12 in the state in which the second opening/closing cover 24 closes the second opening 21.

The housing frame 18 is provided with an upper end 18A. The upper end 18A is an end at which the second opening 21 is formed in the front surface 12. The housing frame 18 includes an engaged portion 18B. The engaged portion 18B is provided at the upper end 18A of the housing frame 18. The engaged portion 18B has a concave shape. The engaged portion 18B is configured to extend along the width direction X.

The engaged portion 18B includes a first contact surface 18C and a second contact surface 18D. The first contact surface 18C is positioned to the front side Y1 of the engaged portion 18B. The first contact surface 18C is a surface facing the rear side Y2. The second contact surface 18D is positioned to the rear side Y2 of the engaged portion 18B. The second contact surface 18D is a surface facing the front side Y1.

In a state in which the engaging portion 24E is engaged with the engaged portion 18B, the engaging portion 24E is in contact with the first contact surface 18C at the front side Y1, and is in contact with the second contact surface 18D at the rear side Y2. In this way, when a force is applied to the second opening/closing cover 24 in the front-rear direction Y in accordance with the opening operation by the user, the second opening/closing cover 24 does not move in the front-rear direction Y.

Figure 11:
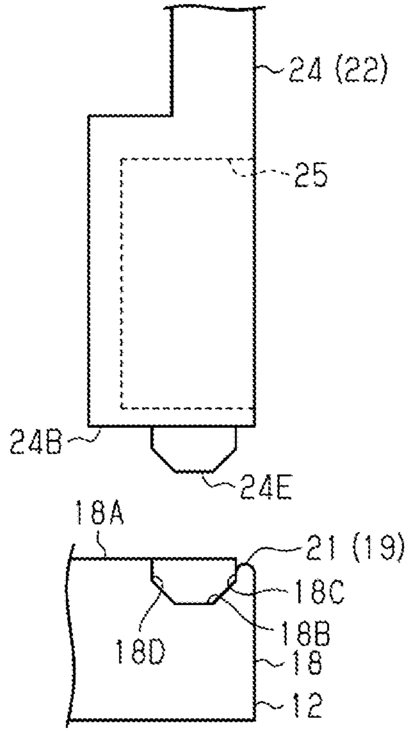
FIG. 11 is a cross-sectional view illustrating the opening/closing cover in accordance with an opening operation.

On the other hand, as illustrated in FIG. 11, when a force is applied to the second opening/closing cover 24 toward the upper side Z1 in accordance with the opening operation by the user, the second opening/closing cover 24 moves to the upper side Z1. In this way, in the state in which the opening/closing cover 22 closes the opening 19, the engaging portion 24E restricts the movement of the second opening/closing cover 24 in the front-rear direction Y. Further, since the engaging portion 24E and the grip portion 25 are provided at the second end 24B of the second opening/closing cover 24, it is possible to improve operability for the user relating to the opening/closing operation of the second opening/closing cover 24.

Detailed Configuration of Medium Support Unit 28

Next, a detailed configuration of the medium support unit 28 will be described.

Figure 12:
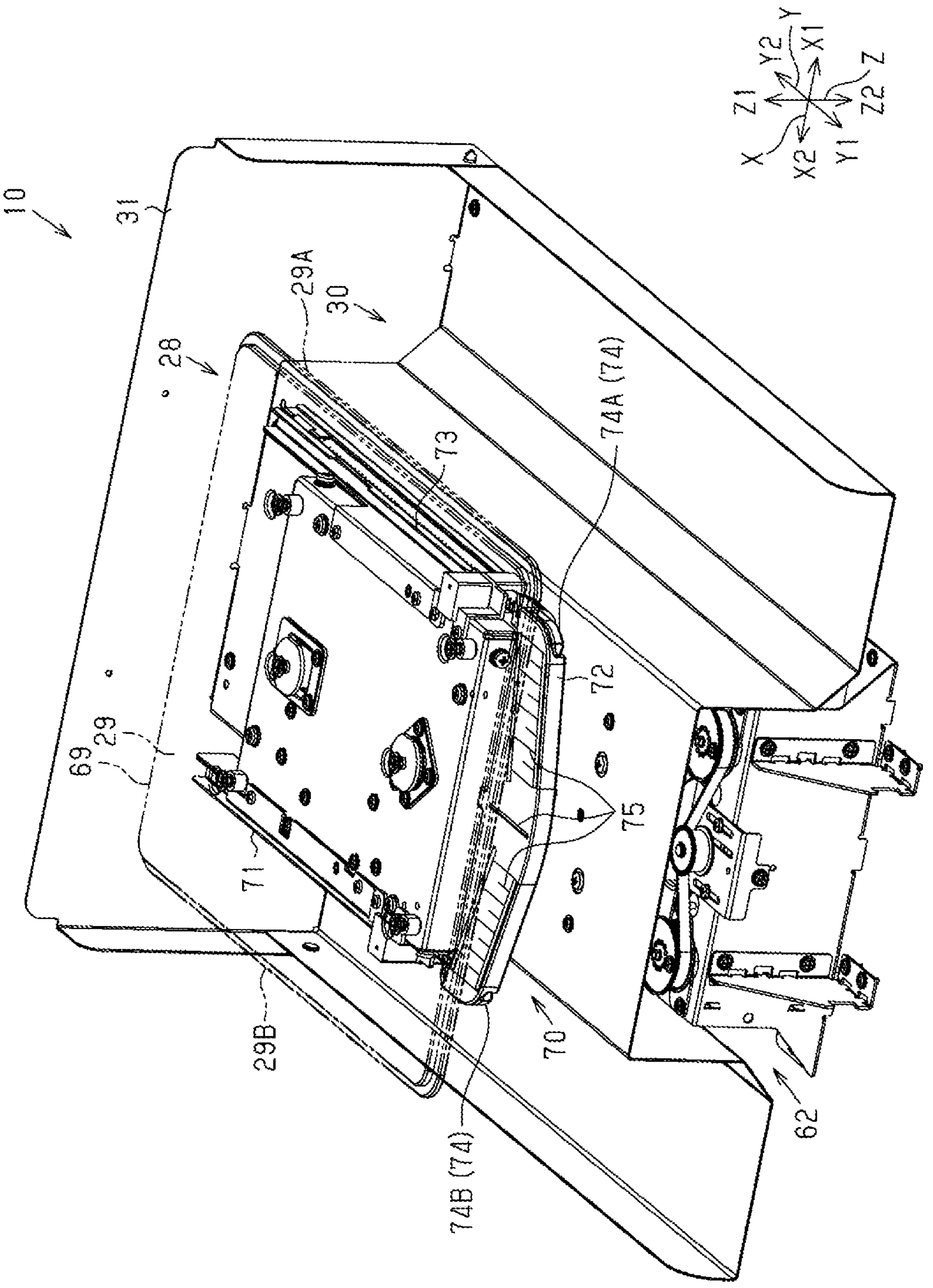
FIG. 12 is a perspective view illustrating a medium support unit and a positioning portion.

As illustrated in FIG. 12, the medium support unit 28 is provided with a tray 69 and a tray support portion 70. The tray 69 may be constituted by a light-transmissive member. In the drawings, the tray 69 is sometimes indicated by a two dot chain line. The tray 69 includes the support surface 29. In other words, the tray 69 is configured to support the medium.

The tray 69 may have a rectangular shape. The lengthwise direction of the tray 69 may be the front-rear direction Y.

The tray support portion 70 is configured to support the tray 69 from the lower side Z2 side. The tray support portion 70 is provided with a main body portion 71. The main body portion 71 is configured to support the tray 69.

The tray support portion 70 is provided with a positioning portion 72. The positioning portion 72 is positioned to the front side Y1 of the tray 69. The positioning portion 72 is configured to determine a placement position of the medium with respect to the tray 69. In particular, the positioning portion 72 is configured to determine the placement position of the medium in the front-rear direction Y with respect to the tray 69. The positioning portion 72 has a line-symmetric shape with respect to a predetermined direction parallel to the support surface 29. In the embodiment, the predetermined direction parallel to the support surface 29 is the front-rear direction Y.

Figure 13:
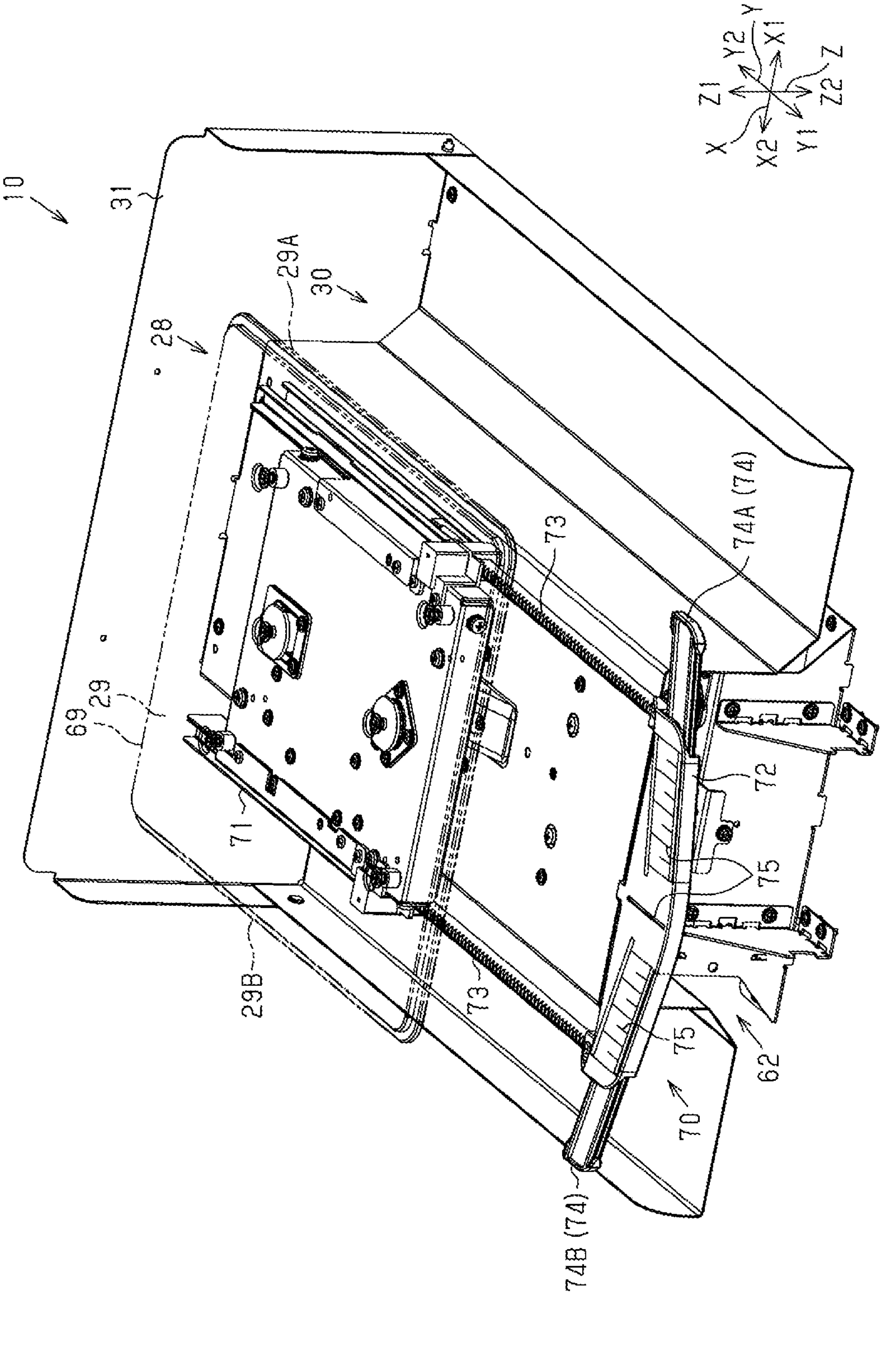
FIG. 13 is a perspective view illustrating the medium support unit and a position changing portion.

As illustrated in FIG. 13, the positioning portion 72 is provided with a position changing portion 73. In particular, the positioning portion 72 may include a pair of the position changing portions 73. The position changing portions 73 can be extended and contracted in the front-rear direction Y with respect to the main body portion 71. One of the pair of position changing portions 73 is provided along the first side end 29A. The other of the pair of position changing portions 73 is provided along the second side end 29B.

The position changing portions 73 can change the position of the positioning portion 72 with respect to the main body portion 71. In other words, the position changing portions 73 can change the placement position of the medium with respect to the tray 69. In particular, the position changing portions 73 can change the placement position of the medium with respect to the tray 69 in the front-rear direction Y.

The positioning portion 72 is provided with an extending/contracting portion 74. The extending/contracting portion 74 can extend and contract in accordance with the shape of the medium. The extending/contracting portion 74 can be extended and contracted in an extending/contracting direction parallel to the support surface 29. In the embodiment, the extending/contracting direction parallel to the support surface 29 is a direction including a component in the width direction X, and the extending/contracting portion 74 can extend and contract in the direction including the component in the width direction X.

The extending/contracting portion 74 includes a first extending/contracting portion 74A and a second extending/contracting portion 74B. The first extending/contracting portion 74A is configured to extend so as to be able to project from the first side end 29A in the first width direction X1. The second extending/contracting portion 74B is configured to extend so as to be able to project from the second side end 29B in the second width direction X2.

The positioning portion 72 is provided with a positioning reference portion 75. The positioning reference portion 75 is disposed at a central position in the front-rear direction Y. Accordingly, when placing the medium on the support surface 29, a reference position, which is the center of the medium indicated by the positioning reference portion 75, can be visually recognized.

Further, the positioning reference portions 75 are disposed at positions that are line-symmetrical with respect to the front-rear direction Y. In this way, when placing the medium on the support surface 29, the reference position of the medium in the width direction X indicated by the positioning reference portions 75 can be visually recognized.

Here, the tray support portion 70 will be described.

Figure 14:
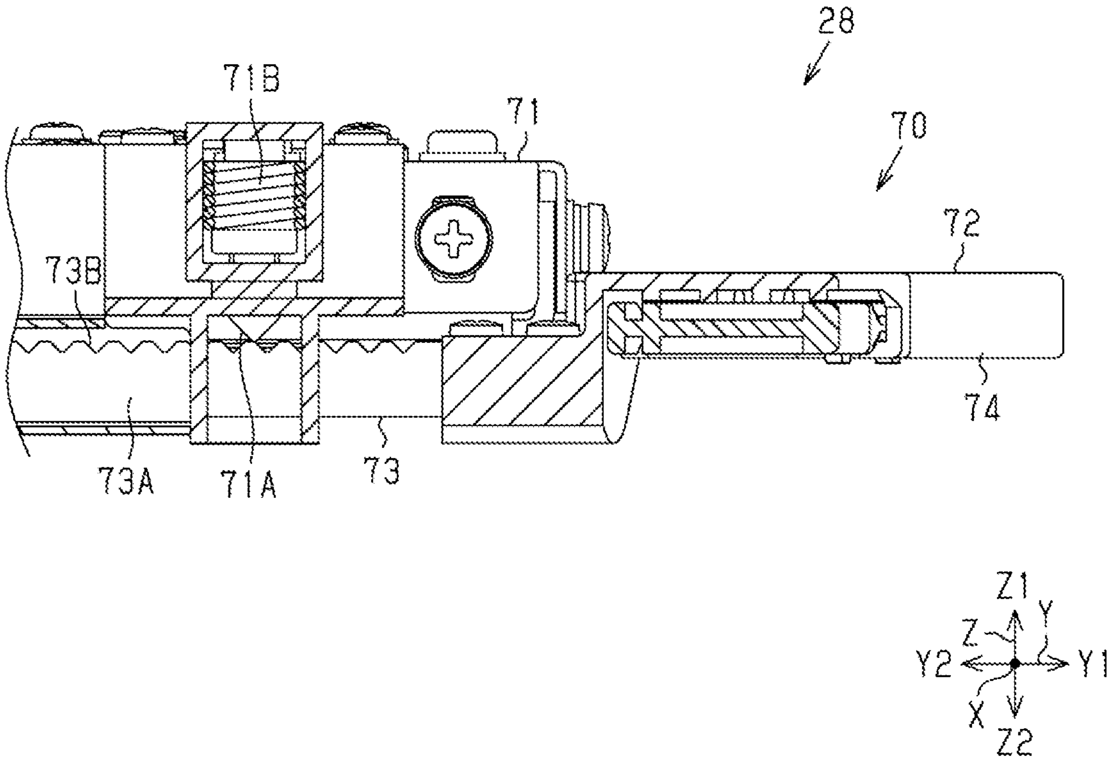
FIG. 14 is a cross-sectional view illustrating a tray support unit.

As illustrated in FIG. 14, in the tray support portion 70, the main body portion 71 is provided with a main body engaging portion 71A and an urging member 71B. The main body engaging portion 71A can move along the vertical direction Z. The urging member 71B urges the main body engaging portion 71A to the lower side Z2. The urging member 71B may be a coil spring.

The position changing portion 73 is provided with a slide guide portion 73A and position changing engaging portions 73B. The slide guide portion 73A is configured to extend in the front-rear direction Y. The slide guide portion 73A is coupled to the positioning portion 72 at the front side Y1. The slide guide portion 73A can engage with the main body portion 71 at the rear side Y2. In this way, the slide guide portion 73A can change the position of the positioning portion 72 with respect to the main body portion 71.

The position changing engaging portions 73B are positioned at the upper side Z1 of the slide guide portion 73A. The position changing engaging portions 73B are positioned to the lower side Z2 of the main body engaging portion 71A. The position changing engaging portions 73B are configured to be able to engage with the main body engaging portion 71A. The position changing engaging portions 73B may be a plurality of groove portions provided at a predetermined interval in the front-rear direction Y. In this manner, the position changing engaging portions 73B are configured to engage with the main body portion 71 at the predetermined interval. Using the position changing engaging portions 73B, the position changing portion 73 can change the positions of the main body portion 71 and of the positioning portion 72 at the predetermined interval.

Position Adjustment Unit 62

As illustrated in FIG. 12 and FIG. 13, the tray support portion 70 is provided with the position adjustment unit 62. That is, the medium support unit 28 is provided with the position adjustment unit 62. The position adjustment unit 62 is configured to adjust the position of the main body 71 in the vertical direction Z. In other words, the position adjustment unit 62 is configured to adjust the position of the tray 69 in the vertical direction Z. In this way, the position adjustment unit 62 is configured to adjust the position of the support surface 29 in the vertical direction Z. The position adjustment unit 62 may be configured to adjust the position of the accommodation tray 31 in the vertical direction Z in conjunction with the adjustment of the position of the support surface 29.

In particular, as illustrated in FIG. 5, the position adjustment unit 62 can adjust the support surface 29 to a printing position in the vertical direction Z. The printing position is a position at which the support surface 29 is disposed when the printing is performed. The printing position is a position at which the support surface 29 is disposed outside the movement range 46 of the head 36. The printing position is a position at which the support surface 29 is disposed to the lower side Z2 of the movement range 46 of the head 36. The printing position is also a position at which the accommodation tray 31 does not cover and hide the first guide portion 42 from the front side Y1.

Figure 15:
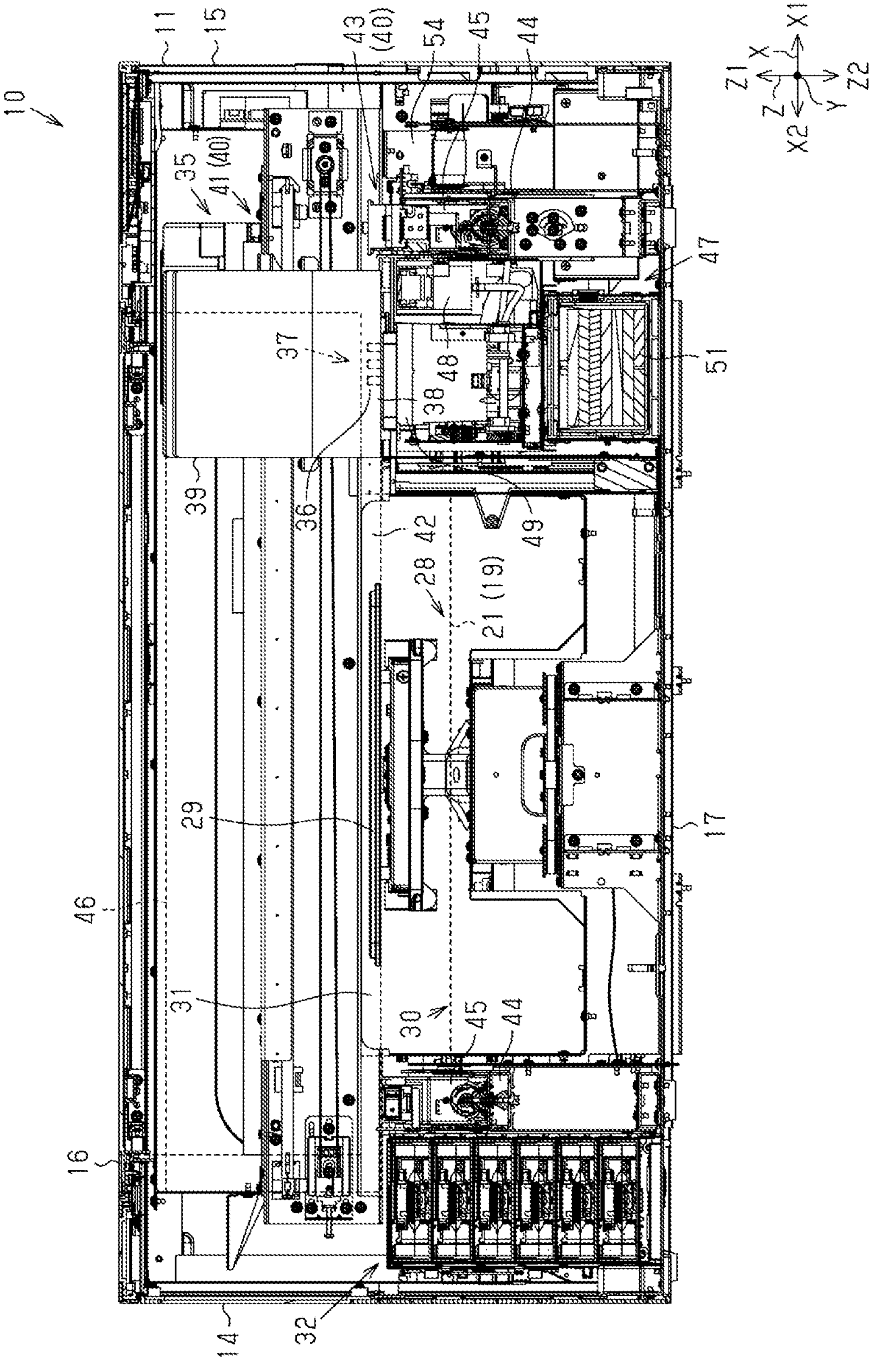
FIG. 15 is a front view illustrating the printing apparatus and a placement position.

On the other hand, as illustrated in FIG. 15, the position adjustment unit 62 can adjust the support surface 29 to a placement position in the vertical direction Z. The placement position is a position at which the support surface 29 is disposed when the medium can be placed on the support surface 29. The placement position is a position at which the support surface 29 is disposed within the movement range 46 of the head 36. The placement position is a position at which the support surface 29 is disposed when the printing is not performed. The placement position is also a position at which the accommodation tray 31 covers and hides the first guide portion 42 from the front side Y1. Accordingly, when the user places the medium on the support surface 29, the user can be inhibited from touching the first guide portion 42. Grease used in order to move the carriage 39 in the width direction X may be adhered to the first guide portion 42. In this way, when the user places the medium on the support surface 29, it is possible to inhibit the grease from being attached to the hand of the user as a result of the user touching the first guide portion 42, and also to suppress the medium from being contaminated.

Printing Control Processing

Here, printing control processing will be described with reference to FIG. 16. The printing control processing is processing executed by the control unit 53 at a predetermined period. Here, the order of the processing can be changed as desired insofar as it does not depart from the purpose of the processing.

Figure 16:
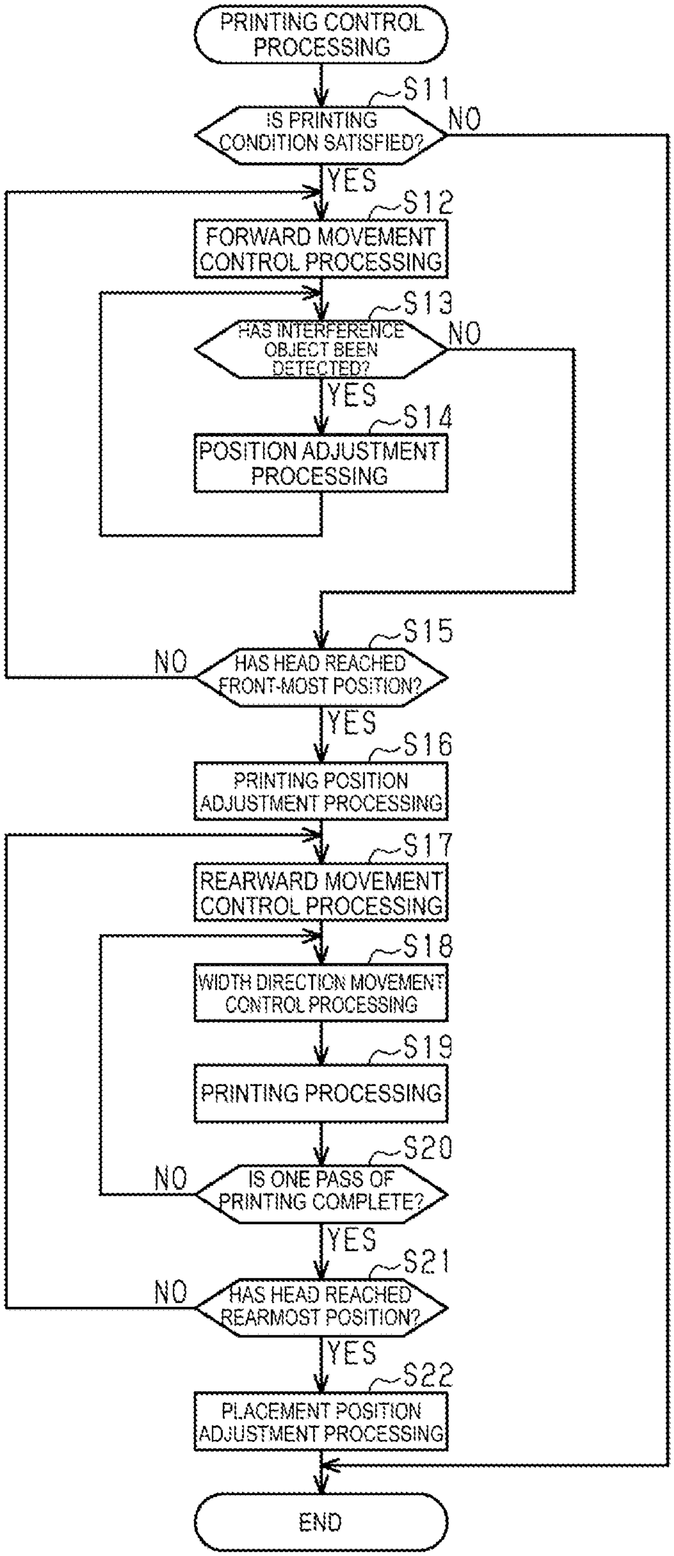
FIG. 16 is a flowchart illustrating printing control processing.

As illustrated in FIG. 16, at step S11, the control unit 53 determines whether or not a printing condition is satisfied. In this processing, the control unit 53 determines that the print condition is satisfied by receiving a print command from the user when printing is not being performed. When the control unit 53 determines that the print condition is not satisfied, the control unit 53 ends the printing control processing. On the other hand, when the control unit 53 determines that the printing condition is satisfied, the control unit 53 shifts the processing to step S12.

At step S12, the control unit 93 performs forward movement control processing. In this processing, the control unit 53 controls the second driving unit 56 so that the second head moving unit 43 moves the head 36 to the front side Y1 by a predetermined distance. When this processing is complete, the control unit 53 shifts the processing to step S13.

At step S13, the control unit 53 determines whether or not an interference object interfering with the head 36 is detected, based on the detection signal from the interference object detector 61. When the control unit 53 determines that the interference object has not been detected, the control unit 53 shifts the processing to step S15 without executing step S14. On the other hand, when the control unit 53 determines that the interference object has been detected, the control unit 53 shifts the processing to step S14.

At step S14, the control unit 93 performs position adjustment processing. In this processing, the control unit 53 controls the position adjustment unit 62 to move the support surface 29 to the lower side Z2 by a predetermined distance. When this processing is complete, the control unit 53 shifts the processing to step S13. In this way, the control unit 53 controls the position adjustment unit 62 to move the support surface 29 to the lower side Z2, to a position at which the interference object is not detected.

At step S15, the control unit 53 determines whether or not the head 36 has reached the front-most position, based on the detection signal from the front position detector 59. When the control unit 53 determines that the head 36 has not reached the front-most position, the control unit 53 shifts the processing to step S12 once more. In this way, the control unit 53 controls the position adjustment unit 62 to move the head 36 to the front side Y1 until the head 36 reaches the front-most position, and to move the support surface 29 to the lower side Z2 until the interference object is not detected. On the other hand, when the control unit 53 determines that the head 36 has reached the front-most position, the control unit 53 shifts the processing to step S16.

At step S16, the control unit 53 performs printing position adjustment processing. In this processing, the control unit 53 controls the position adjustment unit 62 so as to move the support surface 29 to the lower side Z2 by a specified distance. In this way, the control unit 53 controls the position adjustment unit 62 to move the support surface 29 to the lower side Z2 by the specified distance from the position at which the interference object is not detected. When this processing is complete, the control unit 53 shifts the processing to step S17.

At step S17, the control unit 53 performs rearward movement control processing. In this processing, the control unit 53 controls the second driving unit 56 to move the head 36 to the rear side Y2 by a predetermined distance. When this processing is complete, the control unit 53 shifts the processing to step S18.

At step S18, the control unit 53 performs width direction movement control processing. In this processing, the control unit 53 controls the first driving unit 55 so that the first head moving unit 4 moves the head 36 in the width direction X by a predetermined distance. When this processing is complete, the control unit 53 shifts the processing to step S19.

At step S19, the control unit 53 performs printing processing. In this processing, the control unit 53 controls the head 36 to perform the printing on the medium based on image data included in the print command. When this processing is complete, the control unit 53 shifts the processing to step S20.

At step S20, the control unit 53 determines whether or not one pass of the printing is complete, based on the detection signal from the movement position detector 58. When the control unit 53 determines that the one pass of the printing is not complete, the control unit 53 shifts the processing to step S18 once more. In this way, the control unit 53 performs the one pass of the printing. When the control unit 53 determines that the one pass of the printing is complete, the control unit 53 shifts the processing to step S21.

At step S21, the control unit 53 determines whether or not the head 36 has reached the rearmost position, based on the detection signal from the rear position detector 60. When the control unit 53 determines that the head 36 has not reached the rearmost position, the control unit 53 shifts the processing to step S17 once more. In this way, the control unit 53 controls the head 36 to move the head 36 to the rear side Y2 and in the width direction X until the head 36 reaches the rearmost position, and to perform the printing on the medium. On the other hand, when the control unit 53 determines that the head 36 has reached the rearmost position, the control unit 53 shifts the processing to step S22.

At step S22, the control unit 53 performs placement position adjustment processing. In this processing, the control unit 53 controls the position adjustment unit 62 to move the support surface 29 to the placement position, by moving the support surface 29 to the upper side Z1. When this processing is complete, the control unit 53 ends the printing control processing.

In this way, when a driving condition is satisfied, the control unit 53 drives the position adjustment unit 62 so that the support surface 29 is positioned at the placement position. The driving condition is satisfied when the printing is not being performed, and the head 36 is disposed at the retracted position. Thus, when the head 36 is disposed at the retracted position while the printing is not being performed, the position adjustment unit 62 can move the support surface 29 to a position higher than the nozzle surface 38 in the vertical direction Z. In other words, when the head 36 is disposed at the retracted position while the printing is not being performed, the position adjustment unit 62 can move the support surface 29 from being outside the movement range to being within the movement range.

Effects of First Embodiment

Effects of the first embodiment will be described.

As illustrated in FIG. 15, in the printing apparatus 10, when a power source is turned on, the support surface 29 is disposed at the placement position in a state in which the head 36 is disposed at the standby position. As a result, the support surface 29 is raised so as to be disposed within the movement range 46 of the head 36.

As illustrated in FIG. 7 to FIG. 9, when the opening/closing cover 22 is opened by the user, the opening 19 is opened. In particular, in the state in which the engaging portion 24E is engaged with the engaged portion 18B, the opening/closing cover 22 is opened by the user so that the second opening/closing cover 24 moves to the upper side Z1. In particular, the first opening/closing cover 23 is opened such that the protruding portion 23E slides along the elongated hole 68C. In accordance with the opening operation, the slide support portion 68 supports the opening/closing cover 22 and is assisted by the gas springs 67. Then, the opening/closing cover 22 can move to a predetermined angle in a folded state, such that the inner surface 23C of the first opening/closing cover 23 and the inner surface 24C of the second opening/closing cover 24 face each other.

On the other hand, when the opening/closing cover 22 is closed by the user, the opening 19 is closed in the state in which the engaging portion 24E is engaged with the engaged portion 18B. In particular, the first opening/closing cover 23 closes the first opening 20 such that the protruding portion 23E slides along the elongated hole 68C. In accordance with the closing operation, the gas springs 67 can suppress the opening/closing cover 22 from dropping abruptly.

Figure 17:
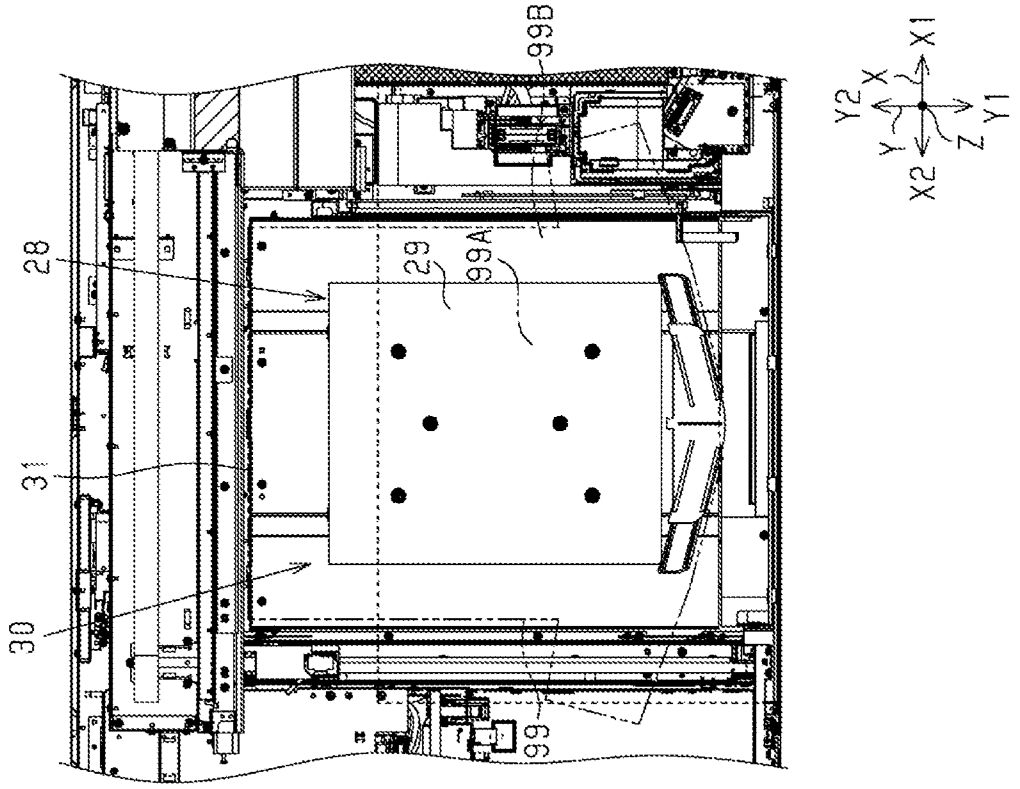
FIG. 17 is a front view illustrating the printing apparatus and a T-shirt on the support surface.

As illustrated in FIG. 17, in the state in which the opening 19 is open and the support surface 29 is disposed at the placement position, the user can easily place a T-shirt 99 on the support surface 29 from the front side Y1. Specifically, the inner surface of the body of the T-shirt 99 is placed on the support surface 29 by passing the body of the T-shirt 99 from the front side Y1 of the tray 69. In this case, at least a printing region 99A of the T-shirt 99 is supported by the support surface 29.

Further, when the T-shirt 99 is placed on the support surface 29, the positioning of the T-shirt 99 with respect to the support surface 29 is performed by the positioning portion 72. In particular, the user can place the T-shirt 99 on the support surface 29 while visually recognizing the center position of the T-shirt 99 in the width direction X and positions that are line-symmetric with respect to the center position of the T-shirt 99, with reference to the positioning reference portions 75. A tag of the T-shirt 99 can be given as an example of the center position of the T-shirt 99 in the width direction X. A position around the neck of the T-shirt 99 can be given an example of positions that are line-symmetric with respect to the center position of the T-shirt 99.

Further, by adjusting the position changing portions 73 and the extending/contracting portion 74 in accordance with the size of the T-shirt 99, the T-shirt 99 can be placed at an appropriate position on the support surface 29. In particular, by adjusting the position changing portions 73, the T-shirt 99 can be placed at an appropriate position on the support surface 29 with respect to the front-rear direction Y. Further, by adjusting the extending/contracting portion 74, the T-shirt 99 can be placed at an appropriate position on the support surface 29 at a position that is line-symmetric with respect to the center position of the T-shirt 99.

Figure 18:
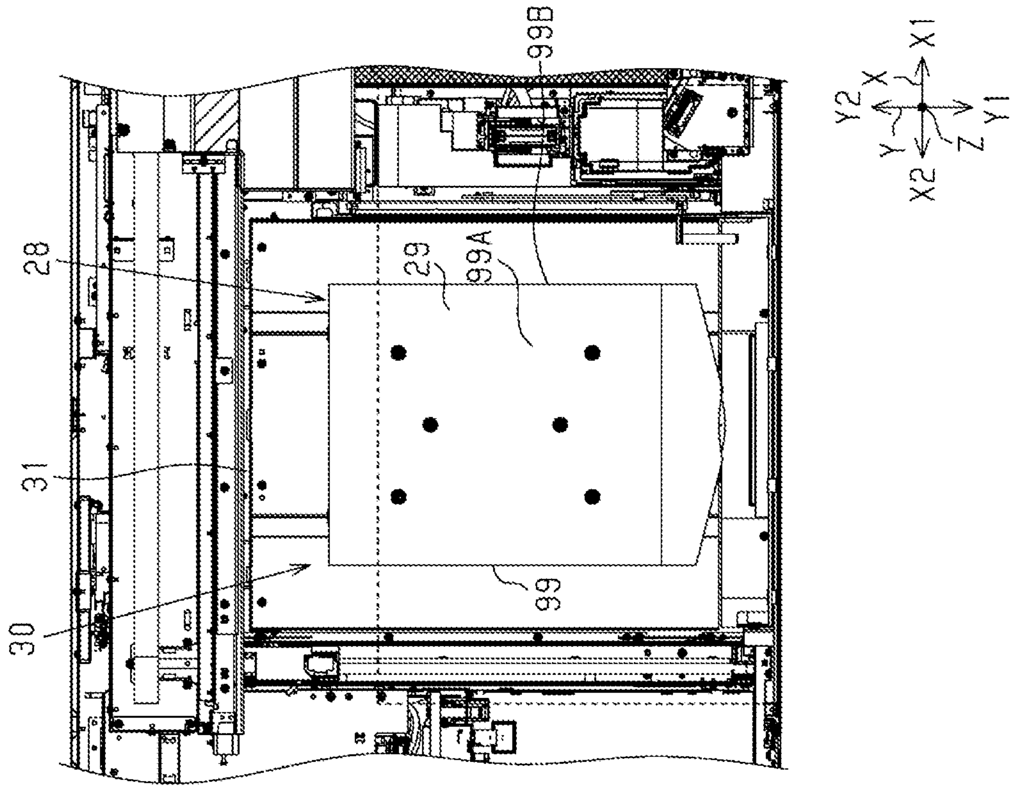
FIG. 18 is a front view illustrating the printing apparatus and a non-placement region.
Figure 19:
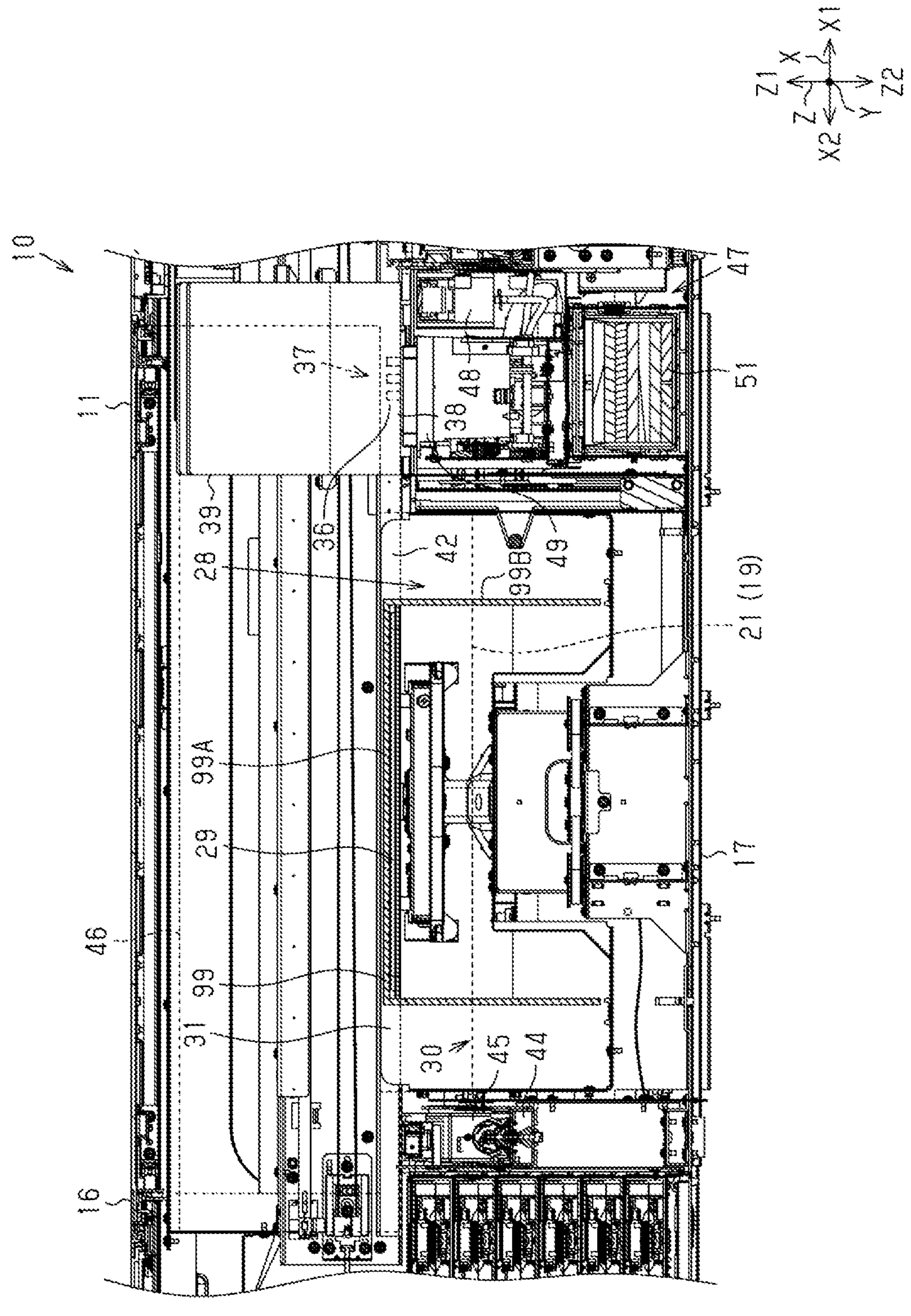
FIG. 19 is a front view illustrating the printing apparatus and the medium accommodation unit.

Then, as illustrated in FIG. 18 and FIG. 19, a non-placement region 99B of the T-shirt 99 is accommodated in the medium accommodation unit 30. The non-placement region 99B is a partial region of the T-shirt 99 that is not supported by the support surface 29. Specifically, the non-placement region 99B is accommodated in the medium accommodation unit 30 in the first width direction X1, the second width direction X2, and at the rear side Y2 of the support surface 29.

As illustrated in FIG. 5, when the print command is input in the state in which the opening 19 is closed, the position adjustment unit 62 moves the support surface 29 to the lower side Z2 to the position at which the interference object is not detected, in accordance with the movement of the head 36 to the front side Y1. As a result, the support surface 29 is disposed at the printing position.

Then, the printing is performed in accordance with the head 36 moving to the rear side Y2. In this way, the printing unit 35 can perform the printing on the medium placed on the support surface 29 without the head 36 colliding with the support surface 29.

Then, as illustrated in FIG. 15, when the printing is complete, the position adjustment unit 62 moves the support surface 29 from the printing position to the placement position in the state in which the head 36 is disposed at the standby position. Thus, when the printing is not being performed, the position adjustment unit 62 can adjust the position of the support surface 29 to the upper side Z1, to a position higher than when the printing is being performed. Further, the accommodation tray 31 moves to the upper side Z1 in conjunction with the support surface 29, and the accommodation tray 31 covers the first guide portion 42 from the front side Y1. Accordingly, the user can be inhibited from touching the first guide portion 42.

Effects of First Embodiment

Effects of the first embodiment will be described.

(1) The medium support unit 28 includes the support surface 29 that supports at least the printing region 99A of the medium. The medium accommodation unit 30 can accommodate the non-placement region 99B of the medium that is not supported by the support surface 29. The medium support unit 28 is configured not to move in the direction parallel to the support surface 29. The head moving unit 40 moves the head 36 in the direction parallel to the support surface 29. In known art, it is necessary for the tray to be moved to the outside of the housing in order to place the medium, and a mechanism for stably moving the tray to the outside of the housing is required, which causes an increase in the size of the printing apparatus. Here, by adopting the above-described configuration, it is not necessary to provide a configuration for moving the support surface 29 in the direction parallel to the support surface 29. Accordingly, the size of the printing apparatus 10 can be reduced. In particular, even in a case in which the configuration including the medium accommodation unit 30 is assumed, the size of the printing apparatus 10 can be reduced.

(2) The medium support unit 28 includes the position adjustment unit 62 that adjusts the position of the support surface 29 in the vertical direction Z. Thus, the printing quality can be improved by appropriately adjusting the positions of the medium supported by the support surface 29 and of the head 36.

(3) The first head moving unit 41 moves the head 36 in the width direction X, and the second head moving unit 43 moves the head 36 in the front-rear direction Y. Thus, the head 36 can be moved in the width direction X and the front-rear direction Y, and it is not necessary to provide a configuration for moving the support surface 29 in the direction parallel to the support surface 29. Accordingly, the size of the printing apparatus 10 can be reduced.

(4) The head moving unit 40 is accommodated in the housing 11. Thus, the head 36 can be moved in the horizontal direction in the state in which the head moving unit 40 is accommodated in the housing 11, and it is possible to change a relative positional relationship between the head 36 and the support surface 29 in the horizontal direction. In this way, it is not necessary to provide a configuration for moving the support surface 29 in the direction parallel to the support surface 29. Accordingly, the size of the printing apparatus 10 can be reduced.

(5) When viewed from the upper side Z1, the opening 19 has a shape longer than the support surface 29 in the width direction X. For this reason, when placing the medium on the support surface 29, handling of the medium in the width direction X becomes easy, and the operability for the user can thus be improved.

(6) The flushing portion 48 is disposed at a position that does not overlap the medium support unit 28 in the vertical direction Z. The waste liquid tank 51 is disposed at a position overlapping with the flushing portion 48 in the vertical direction Z. Thus, it is possible to collectively dispose the flushing portion 48 and the waste liquid tank 51 at the position overlapping in the vertical direction Z, even while achieving a size reduction in the vertical direction Z at the position at which the medium support unit 28 is provided. Thus, the size of the printing apparatus 10 can be reduced while efficiently disposing the flushing portion 48 and the waste liquid tank 51.

(7) The wiping portion 49 is disposed at a position that does not overlap the medium support unit 28 in the vertical direction Z. The waste liquid tank 51 is disposed at a position overlapping with the wiping portion 49 in the vertical direction Z. Thus, it is possible to collectively dispose the wiping portion 49 and the waste liquid tank 51 at a position overlapping in the vertical direction Z, while achieving the size reduction in the vertical direction Z at the position at which the medium support unit 28 is provided. Thus, it is possible to reduce the size of the printing apparatus 10 while efficiently disposing the wiping portion 49 and the waste liquid tank 51.

(8) The housing 11 accommodates the medium support unit 28 and the printing unit 35. When the printing is not being performed, when the head 36 is disposed at the retracted position at which the nozzle surface 38 does not face the support surface 29, the position adjustment unit 62 can move the support surface 29 from being outside the movement range 46 of the head 36 to being within the movement range 46. In known art, it is necessary to move the tray to the outside of the housing in order to place the medium. Therefore, a space for placing the medium has to be secured on the outside of the housing. Therefore, it is necessary to secure a sufficient installation space for installing the printing apparatus. Here, by adopting the above-described configuration, since the medium support unit 28 and the printing unit 35 are accommodated in the housing 11, it is not necessary to secure the space for placing the medium on the outside of the housing 11. Thus, the installation space of the printing apparatus 10 can be reduced.

(9) Further, as long as the printing is not being performed and the head 36 is disposed at the retracted position, the support surface 29 can be moved from being outside the movement range 46 of the head 36 to being within the movement range 46. Thus, when placing the medium on the support surface 29, the handling of the medium becomes easy, and it is possible to improve the operability for the user. Further, the installation space of the printing apparatus 10 can be reduced.

(10) The housing 11 includes the opening 19 that exposes the support surface 29. For this reason, it is possible to place the medium on the support surface 29 accommodated in the housing 11 from the outside of the housing 11 through the opening 19, and it is possible to improve the operability for the user.

(11) The housing 11 includes the opening/closing cover 22 that can open and close the opening 19. Thus, when the opening 19 is opened by the opening/closing cover 22, it is possible to place the medium on the support surface 29 accommodated in the housing 11 from the outside of the housing 11 through the opening 19, and operability for the user can thus be improved. On the other hand, when the opening 19 is closed by the opening/closing cover 22, it is possible to prevent foreign matter from entering the inside of the housing 11 from the outside of the housing 11 through the opening 19.

(12) The movement range 46 of the head 36 includes the position at which the nozzle surface 38 faces the maintenance unit 47. Thus, it is possible to perform maintenance of the nozzle surface 38 by moving the nozzle surface 38 to the position facing the maintenance unit 47, and it is possible to suppress a decrease in printing quality.

(13) The maintenance unit 47 includes the flushing portion 48 that receives the liquid ejected from the head 36. Thus, by moving the nozzle surface 38 to the position facing the flushing portion 48, it is possible to receive the liquid ejected from the head 36, and it is possible to suppress a decrease in the printing quality.

(14) The maintenance unit 47 includes the wiping portion 49 that can wipe the nozzle surface 38. Thus, it is possible to wipe the nozzle surface 38 by moving the nozzle surface 38 to the position facing the wiping portion 49, and it is possible to suppress a decrease in the printing quality.

(15) When the printing is not being performed, when the head 36 is disposed at the retracted position, the position adjustment unit 62 can move the support surface 29 to a position higher than the nozzle surface 38 in the vertical direction Z. Therefore, when printing is not being performed and the head 36 is disposed at the retracted position, the support surface 29 can be moved to a position higher than the nozzle surface 38. Thus, when placing the medium on the support surface 29, the user can perform the operation at a position close to the user, using the first opening 20 in the housing 11. Therefore, handling of the medium becomes easy, and it is possible to improve operability for the user.

(16) The first opening/closing cover 23 is coupled to the top surface 16 by the first coupling portion 65, and the second opening/closing cover 24 is coupled to the first opening/closing cover 23 by the second coupling portion 66. The first opening/closing cover 23 can move to the predetermined angle with respect to the top surface 16. The first opening/closing cover 23 and the second opening/closing cover 24 can be folded so that the inner surface 23C of the first opening/closing cover 23 and the inner surface 24C of the second opening/closing cover 24 face each other when opening the first opening 20 and the second opening 21. In known art, when the opening/closing cover is opened, sufficient space is required around the printing apparatus. Here, by adopting the above-described configuration, the first opening 20 and the second opening 21 can be opened in the state of the first opening/closing cover 23 and the second opening/closing cover 24 being folded such that the inner surface 23C of the first opening/closing cover 23 and the inner surface 24C of the second opening/closing cover 24 face each other. In this way, the opening/closing operation can be performed in the state in which the first opening/closing cover 23 and the second opening/closing cover 24 are coupled to each other. Further, when the first opening/closing cover 23 and the second opening/closing cover 24 open the first opening 20 and the second opening 21, it is possible to reduce the space required around the printing apparatus 10. In particular, the first opening/closing cover 23 and the second opening/closing cover 24 can be folded such that the inner surface 23C of the first opening/closing cover 23 and the inner surface 24C of the second opening/closing cover 24 face each other, and it is thus possible to make it less likely for the user positioned at the front side Y1 to feel cramped. Thus, the installation space of the printing apparatus 10 can be reduced, and the operability for the user can be improved.

(17) The printing apparatus 10 is provided with the opening/closing detector 63 that detects the open/closed state of the first opening/closing cover 23. Thus, it is possible to perform an operation in accordance with the open/closed state of the first opening/closing cover 23. Accordingly, the operability for the user can be further improved.

(18) The second opening/closing cover 24 includes the engaging portion 24E that engages with the front surface 12 when the second opening 21 is closed. Thus, the second opening/closing cover 24 can stably close the second opening 21. Accordingly, the operability for the user can be further improved.

(19) The engaging portion 24E restricts the movement of the second opening/closing cover 24 in the front-rear direction Y when the second opening 21 is closed by the second opening/closing cover 24. Thus, the opening operation of the second opening/closing cover 24 can be smoothly performed. Accordingly, the operability for the user can be improved.

(20) The engaging portion 24E is provided at the second end 24B of the second opening/closing cover 24. Thus, the second opening/closing cover 24 can close the second opening 21 more stably. Accordingly, the operability for the user can be improved. In order to open the opening/closing cover 22 in the state in which the engaging portion 24E is engaged, it is necessary to move the second opening/closing cover 24 to the upper side Z1. As the second opening/closing cover 24 is moved to the upper side Z1, the first opening/closing cover 23 also moves, and the opening/closing detector 63 detects that the first opening/closing cover 23 has been opened.

(21) The grip portion 25 is provided at the second end 24B of the second opening/closing cover 24. Thus, it is possible to provide a situation in which the second opening/closing cover 24 is easily gripped by the user in accordance with the opening/closing operation of the second opening/closing cover 24. Accordingly, the operability for the user can be improved. In particular, when the first opening/closing cover 23 and the second opening/closing cover 24 are folded such that the inner surface 23C of the first opening/closing cover 23 and the inner surface 24C of the second opening/closing cover 24 face each other, the grip portion 25 is disposed at a low position in the vertical direction Z. Thus, it is possible to improve the operability for the user, even if the body height of the user is short.

(22) The printing apparatus 10 is provided with the slide support portion 68 that slidably supports the first opening/closing cover 23 in accordance with the opening/closing operation of the first opening/closing cover 23. Thus, the opening/closing operation of the first opening/closing cover 23 can be smoothly performed. Accordingly, the operability for the user can be improved.

(23) The printing apparatus 10 is provided with the gas springs 67 that adjust the opening/closing operation of the first opening/closing cover 23. Thus, the opening/closing operation of the first opening/closing cover 23 can be adjusted. Accordingly, the operability for the user can be improved.

(24) The first opening 20 is open between the front surface 12 and the first position 20A in the front-rear direction Y. The first position 20A is a position closer to the back surface 13 than to the front surface 12. The first shaft 23D is provided at the first position 20A. The first opening 20 is open between the front surface 12 and the first shaft 23D in the front-rear direction Y. For this reason, even when the first opening 20 that opens widely in the front-rear direction Y is provided, it is possible to reduce the installation space of the printing apparatus 10, and it is also possible to improve the operability for the user.

(25) The first opening 20 has the shape that is longer than the support surface 29 in the width direction X, when viewed from the vertical direction Z. For this reason, even when the first opening 20 that opens widely in the width direction X is provided, it is possible to reduce the installation space of the printing apparatus 10, and it is also possible to improve the operability for the user.

(26) The tray support portion 70 supports the tray 69 having the support surface 29 on which the medium can be placed, and includes the positioning portion 72 that determines the placement position of the medium with respect to the tray 69. In known art, in order to move the tray in the horizontal direction, a positioning portion is provided at the tray itself on which the medium is placed. For this reason, the tray becomes heavy, and it is desired to reduce the weight of the tray in order to stably support the tray. Here, by adopting the above-described configuration, the positioning portion 72 that determines the placement position of the medium with respect to the tray 69 is provided not at the tray 69 itself but at the tray support unit 70 that supports the tray 69. Therefore, the weight of the tray 69 can be reduced.

(27) The positioning portion 72 includes the position changing portions 73 that can change the placement position of the medium with respect to the tray 69. Therefore, the position changing portions 73 are provided at the positioning portion 72. Thus, at the same time as being able to change the placement position of the medium with respect to the tray 69, it is also possible to reduce the weight of the tray 69.

(28) The position changing portions 73 can change the placement position of the medium with respect to the tray 69 in the front-rear direction Y. Therefore, the placement position of the medium can be adjusted in the front-rear direction Y. Thus, at the same time as being able to change the placement position of the medium with respect to the tray 69, it is also possible to reduce the weight of the tray 69.

(29) The tray support portion 70 includes the main body portion 71. The position changing portion 73 includes the position changing engaging portions 73B that engage with the main body portion 71 at the predetermined interval. Thus, the placement position of the medium with respect to the tray 69 can be adjusted at the predetermined interval. Thus, at the same time as being able to change the placement position of the medium with respect to the tray 69, it is also possible to reduce the weight of the tray 69.

(30) The positioning portion 72 has the line symmetric shape with respect to the front-rear direction Y. Thus, it is possible to appropriately place the medium having line symmetry on the support surface 29, using the positioning portion 72. Accordingly, the operability for the user can be improved.

(31) The positioning portion 72 includes the positioning reference portions 75 at the positions that are line-symmetric with respect to the front-rear direction Y. Thus, it is possible to appropriately place the medium on the placement surface while visually checking the positioning reference portions 75. Accordingly, the operability for the user can be improved.

(32) The positioning portion 72 includes the extending/contracting portion 74 that can extend and contract in accordance with the shape of the medium. Thus, it is possible to change the placement position of the medium with respect to the tray 69, using the extending/contracting portion 74. Thus, at the same time as being able to change the placement position of the medium with respect to the tray 69, it is also possible to reduce the weight of the tray 69.

(33) The extending/contracting portion 74 can extend and contract in the extending/contracting direction parallel to the support surface 29. Therefore, it is possible to adjust the placement position of the medium in the extending/contracting direction parallel to the support surface 29. Thus, at the same time as being able to change the placement position of the medium with respect to the tray 69, it is also possible to reduce the weight of the tray 69.

(34) The extending/contracting portion 74 can extend and contract in the direction including the component in the width direction X. Therefore, it is possible to adjust the placement position of the medium in the direction including the component in the width direction X. Thus, at the same time as being able to change the placement position of the medium with respect to the tray 69, it is also possible to reduce the weight of the tray 69.

Modified Examples

The embodiment can be modified and implemented as follows. The embodiment and the following modified examples can be combined and implemented insofar as no technical contradictions arise.

Figure 20:
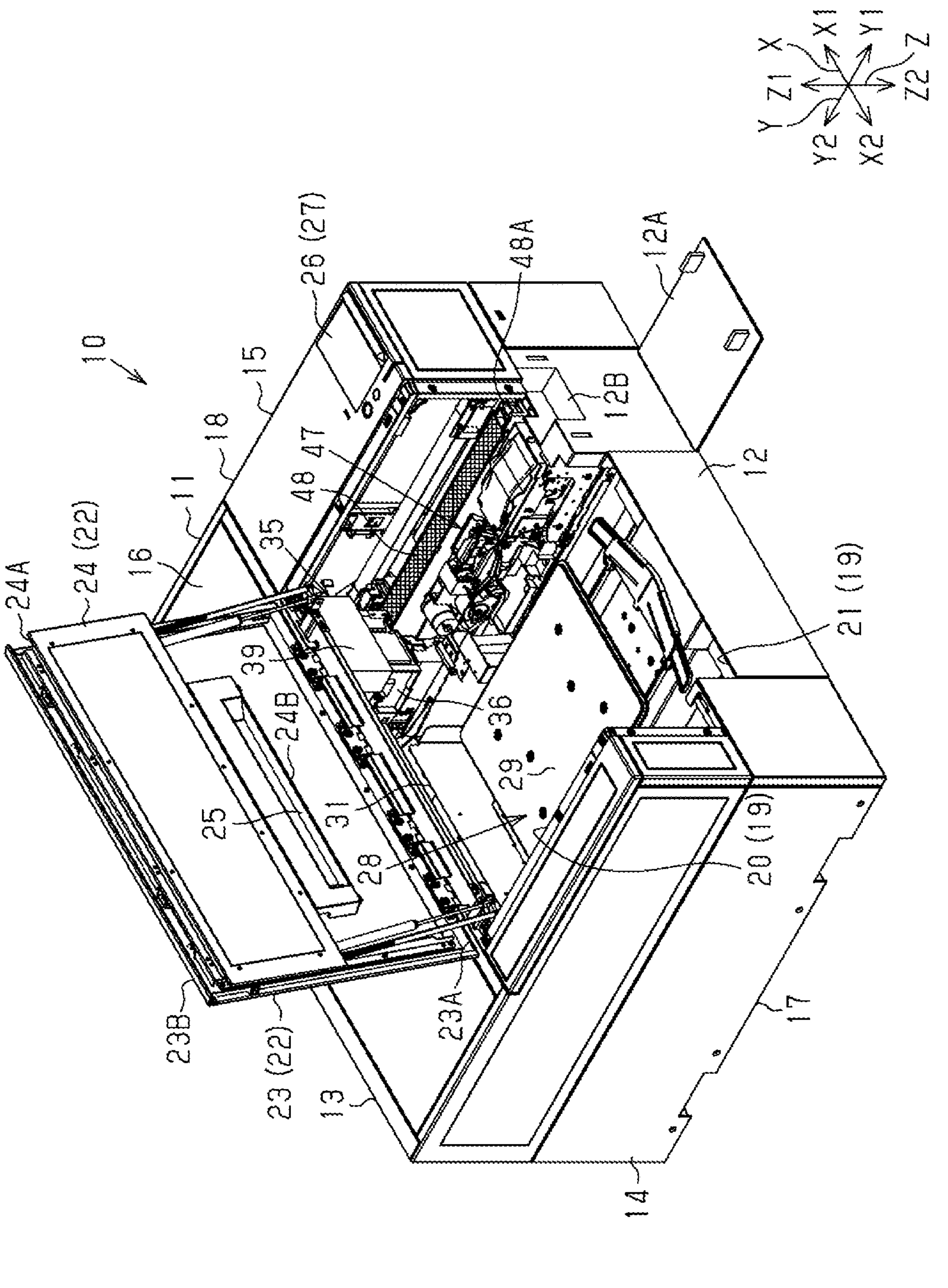
FIG. 20 is a perspective view illustrating the printing apparatus and a front cover.

As illustrated in FIG. 20, the housing 11 may be provided with a front cover 12A. The front cover 12A can be attached to and detached from the housing frame 18 at the front surface 12. The housing 11 may be provided with a cutout 12B. The cutout 12B is exposed at the front surface 12 when the front cover 12A is removed from the front surface 12. The cutout 12B is configured to extend toward the rear side Y2. The cutout 12B is configured to expose a first end 48A of the flushing portion 48 in a front view. The first end 48A of the flushing portion 48 is an end at the front side Y1. The first end 48A of the flushing portion 48 is provided with a removal portion for the user to remove the flushing portion 48. By providing the cutout 12B in this way, even when the flushing portion 48 is provided at a position separated from the front surface 12 toward the rear side Y2, the flushing portion 48 can be easily removed from the front side Y1.

The housing 11 may include a rear cover (not illustrated). The rear cover can be attached to and detached from the housing frame 18 at the back surface 13. The control board 52 may be covered with the rear cover, and may be exposed by removing the back cover. In this way, maintenance of the control board 52 can be performed.

The housing 11 may include a left side cover (not illustrated). The left side cover can be attached to and detached from the housing frame 18 at the left side surface 14. The liquid supply unit 32 may be covered by the left side cover, and may be exposed by removing the left side cover. In this way, maintenance of the liquid supply unit 32 can be performed. Further, the liquid supply unit 32 may be covered by the left side cover and the rear cover, and may be exposed by removing the left side cover and the rear cover.

The housing 11 may include a right side cover (not illustrated). The right side cover can be attached to and detached from the housing frame 18 at the right side surface 15. The power supply unit 54 may be covered by the right side cover, and may be exposed by removing the right side cover. In this way, maintenance of the power supply unit 54 can be performed.

In plan view, the first opening 20 may have a shape having the same length as the support surface 29 in the front-rear direction Y, or may have a shape longer than the support surface 29 in the front-rear direction Y. In plan view, the first opening 20 may have a shape having the same length as the support surface 29 in the width direction X, or may have a shape shorter than the support surface 29 in the width direction X.

The first opening 20 and the second opening 21 need not necessarily be continuous with each other and may be provided separately from each other. The opening 19 need not necessarily be provided across the top surface 16 and the front surface 12.

The opening 19 may be provided across the top surface 16, the front surface 12, and the other surfaces. That is, the opening 19 may be provided across at least the top surface 16 and the front surface 12. The opening 19 may be provided at the top surface 16 and not be provided at the front surface 12. That is, it is sufficient that the opening 19 be provided at least at the top surface 16.

The opening/closing detector 63 may be configured to detect the open/closed state of the second opening/closing cover 24. In this way, an operation in accordance with the open/closed state of the second opening/closing cover 24 becomes possible. Thus, the operability for the user can be improved. Further, the opening/closing detector 63 may include a first opening/closing detector that detects the open/closed state of the second opening/closing cover 24, and a second opening/closing detector that detects the open/closed state of the second opening/closing cover 24.

The support surface 29 is configured not to move in the horizontal direction. However, for example, the support surface 29 may be finely adjustable in the horizontal direction only when the printing is not being performed, and it is sufficient that the support surface 29 be configured not to move in the horizontal direction at least when the printing is being performed.

The first opening 20 may have a shape that is longer than the support surface 29 in the front-rear direction Y when viewed from the upper side Z1.

When placing the medium on the support surface 29, a partial region of the medium may be accommodated in the medium accommodation unit 30 after the partial region of the medium is provisionally placed on the top surface or the like of the liquid supply unit 32. In this way, it is possible to appropriately place the medium on the support surface 29. A placement reference portion serving as a reference when placing the partial region of the medium may be provided on the top surface or the like of the liquid supply unit 32. The placement reference portion may be, for example, a scale or the like whose dimensions can be specified, and it is preferable that the placement reference portion allows the user to identify whether the position of the medium to be placed is appropriate.

When maintenance is performed in a state in which the printing is not being performed, the position adjustment unit 62 may move the support surface 29 from the placement position to the printing position. When maintenance, such as flushing, is performed in a state in which the printing is being performed, the position adjustment unit 62 may continuously dispose the support surface 29 at the printing position.

The position adjustment unit 62 may adjust the position of the support surface 29 in the vertical direction Z from the printing position to the placement position when the opening 19 is opened by the opening/closing cover 22. The position adjustment unit 62 may adjust the position of the support surface 29 in the vertical direction Z from the placement position to the printing position when the opening 19 is closed by the opening/closing cover 22.

In a single print command, the printing unit 35 may eject the liquid of one color or the liquid of a plurality of colors. In the single print command, the printing unit 35 may perform the printing when the head 36 is moved a plurality of times in the front-rear direction Y. As a specific example, when the single print command is input, the printing unit 35 may eject a white liquid in accordance with a first movement to the rear side Y2 and may eject a liquid of a color other than white in accordance with a second or subsequent movement to the rear side Y2. In this case, the position adjustment unit 62 adjusts the position of the support surface 29 in the vertical direction Z in accordance with a first movement to the front side Y1, but the position adjustment unit 62 may adjust the position of the support surface 29 in the vertical direction Z in accordance with a second or subsequent movement to the front side Y1. Further, the control unit 53 may determine that an error has occurred when the interference object is detected in association with a second or subsequent movement to the front side Y1. Further, when the interference object is detected even when the position of the support surface 29 in the vertical direction Z has been adjusted in accordance with the first movement to the front side Y1, the control unit 53 may determine that an error has occurred.

The printing unit 35 may perform the printing when the head 36 moves to either one of the front side Y1 and the rear side Y2, or may perform the printing both when the head 36 moves to the front side Y1 and when the head 36 moves to the rear side Y2.

The printing unit 35 may perform the printing when the head 36 moves in any one of the first width direction X1 and the second width direction X2, or may perform the printing both when the head 36 moves in the first width direction X1 and when the head 36 moves in the second width direction X2.

The head 36 may include the nozzle surface 38 that is parallel to the horizontal plane or may include the nozzle surface 38 that is inclined with respect to the horizontal plane.

The maintenance unit 47 need not necessarily include at least one of the flushing portion 48, the wiping unit 49, the suction portion 50, and the waste liquid tank 51.

The position changing unit 73 may be able to change the placement position of the medium with respect to the tray 69 in a direction including a component in the front-rear direction Y. The position changing unit 73 may be able to change the placement position of the medium with respect to the tray 69 in the width direction X.

It is sufficient that the extending/contracting portion 74 be able to extend and contract in a direction including a component of the width direction X, and the extending/contracting portion 74 may be able to extend and contract in the width direction X. The extending/contracting portion 74 may extend and contract in a direction intersecting the direction in which the position changing unit 73 changes the placement position of the medium with respect to the tray 69. Similarly to the position changing unit 73, the extending/contracting portion 74 may be adjustable at a predetermined interval.

It is sufficient that the positioning reference portion 75 be able to specify at least one of the center position of the medium and the positions that are line-symmetric with respect to the center position of the medium. For example, as long as it can be visually recognized, the positioning reference portion 75 may be provided with a mark capable of specifying a position, or may have a shape capable of specifying a position. The positioning reference portion 75 need not necessarily be provided at the position changing unit 73. The positioning portion 72 need not necessarily include at least one of the position changing portion 73, the extending/contracting portion 74, and the positioning reference portion 75.

The relationship between the width direction X and the front-rear direction Y in the embodiment may be switched. In other words, the width direction X of the embodiment may be the front-rear direction Y, and the front-rear direction Y of the embodiment may be the width direction X.

For example, the medium is not limited to the T-shirt, a polo shirt, or the like, and may be a sweatshirt, a hooded sweatshirt, or the like, for example, or may be a medium such as clothing. Further, the medium having flexibility is adopted as the medium, but the medium is not limited to this example, and a medium having no flexibility, such as a smartphone case printed using UV ink, may be adopted, for example.

The printing apparatus 10 may be configured to eject ink as an example of the liquid, but may be configured to eject a liquid other than ink. In other words, the liquid can be arbitrarily selected as long as it can perform the printing on the medium by adhering to the medium. The printing apparatus 10 performs the printing on the medium by ejecting the liquid onto the medium, but is not limited to this example, and may perform the printing on the medium by a laser method, for example.

As used herein, the phrase "at least one of" means one or more of specific alternatives. As an example, the phrase "at least one of" as used herein means only one alternative or both of two alternatives, when the number of alternatives is two. As another example, the phrase "at least one of" as used herein means only one alternative, or any combination of two or more alternatives, when the number of alternatives is three or more.

Supplementary Description

Hereinafter, technical concepts and effects thereof that are understood from the above-described exemplary embodiments and modified examples are described.

(A) A printing apparatus includes a medium support unit having a support surface supporting at least a printing region of a medium, a medium accommodation unit configured to accommodate a region, of the medium, not supported by the support surface, a head configured to eject a liquid onto the medium supported by the support surface, and a head moving unit configured to move the head. The medium support unit is configured not to move in a direction parallel to the support surface, and the head moving unit moves the head in a direction parallel to the support surface.

According to this configuration, it is not necessary to provide a configuration for moving the support surface in a direction parallel to the support surface. Accordingly, the size of the printing apparatus can be reduced. In particular, it is possible to achieve a reduction in the size of the printing apparatus even when the configuration is assumed in which the medium accommodation unit capable of accommodating the region of the medium that is not supported by the support surface is provided.

(B) In the printing apparatus, the medium support unit may include a position adjustment unit configured to adjust a position of the support surface in an intersecting direction intersecting the support surface.

According to this configuration, printing quality can be improved by appropriately adjusting the positions of the medium supported by the support surface and of the head.

(C) In the printing apparatus, the head moving unit may include a first head moving unit and a second head moving unit. The first head moving unit may move the head in a first direction parallel to the support surface, and the second head moving unit may move the head in a second direction parallel to the support surface and intersecting the first direction.

According to this configuration, the head can be moved in the first direction and the second direction, and there is no need to provide a configuration for moving the support surface in a direction parallel to the support surface. Accordingly, the size of the printing apparatus can be reduced.

(D) The printing apparatus may include a housing, and the head moving unit may be accommodated in the housing.

According to this configuration, it is possible to move the head in the horizontal direction in a state in which the head moving unit is accommodated in the housing, and it is not necessary to provide a configuration for moving the support surface in a direction parallel to the support surface. Accordingly, the size of the printing apparatus can be reduced.

(E) In the printing apparatus, the housing may include a first surface parallel to the support surface, an opening provided at least at the first surface, and an opening/closing cover configured to open and close the opening. The opening may have a shape longer than the support surface in a predetermined direction parallel to the first surface, when viewed from an intersecting direction intersecting the support surface.

According to this configuration, when placing the medium on the support surface, a gap between the support surface and the housing is widened at least in the predetermined direction parallel to the first surface, and handling of the medium becomes easy. Operability for the user can thus be improved.

(F) In the printing apparatus, the housing may includes a first surface parallel to the support surface, a second surface intersecting the first surface, an opening provided across at least the first surface and the second surface, and an opening/closing cover configured to open and close the opening. The opening may have a shape that is longer than the support surface in a direction parallel to the first surface and parallel to the second surface, when viewed from an intersecting direction intersecting the support surface.

According to this configuration, when placing the medium on the support surface, handling of the medium in the direction parallel to the first surface and parallel to the second surface becomes easy, and operability for the user can thus be improved.

(G) The printing apparatus may include a flushing portion configured to receive the liquid ejected from the head, and a waste liquid tank configured to store the liquid received by the flushing portion. The flushing portion may be disposed at a position not overlapping the medium support unit in an intersecting direction intersecting the support surface, and the waste liquid tank may be disposed at a position overlapping the flushing portion in the intersecting direction.

According to this configuration, it is possible to collectively dispose the flushing portion and the waste liquid tank at a position overlapping in the intersecting direction, while achieving a size reduction in the intersecting direction at the position at which the medium support unit is provided. Thus, it is possible to reduce the size of the printing apparatus while efficiently disposing the flushing portion and the waste liquid tank.

(H) The printing apparatus may include a wiping portion configured to wipe a nozzle surface of the head. The wiping portion may be disposed at a position not overlapping the medium support unit in the intersecting direction, and the waste liquid tank may be disposed at a position overlapping the wiping portion in the intersecting direction.

According to this configuration, it is possible to collectively dispose the wiping portion and the waste liquid tank at a position overlapping in the intersecting direction, while achieving the size reduction in the intersecting direction at the position at which the medium support unit is provided. Thus, it is possible to reduce the size of the printing apparatus while efficiently disposing the wiping portion and the waste liquid tank.

What is claimed is:

1. A printing apparatus comprising:
a medium support unit having a support surface supporting at least a printing region of a medium;
a medium accommodation unit configured to accommodate a region, of the medium, not supported by the support surface;
a head configured to eject a liquid onto the medium supported by the support surface; and
a head moving unit configured to move the head, wherein
the head moving unit moves the head in a first direction parallel to the support surface, and
the medium support unit is configured not to move in a second direction parallel to the support surface and intersecting the first direction.

2. The printing apparatus according to claim 1, wherein
the medium support unit includes a position adjustment unit configured to adjust a position of the support surface in an intersecting direction intersecting the support surface.

3. The printing apparatus according to claim 1, wherein
the head moving unit includes a first head moving unit and a second head moving unit, the first head moving unit moves the head in the first direction, and
the second head moving unit moves the head in the second direction.

4. The printing apparatus according to claim 1, comprising:
a housing, wherein the head moving unit is accommodated in the housing.

5. The printing apparatus according to claim 4, wherein
the housing includes a first surface parallel to the support surface, an opening provided at least at the first surface, and an opening/closing cover configured to open and close the opening, and
the opening has a shape longer than the support surface in a predetermined direction parallel to the first surface, when viewed from an intersecting direction intersecting the support surface.

6. The printing apparatus according to claim 4, wherein
the housing includes a first surface parallel to the support surface, a second surface intersecting the first surface, an opening provided across at least the first surface and the second surface, and an opening/closing cover configured to open and close the opening, and
the opening has a shape that is longer than the support surface in a direction parallel to the first surface and parallel to the second surface, when viewed from an intersecting direction intersecting the support surface.

7. The printing apparatus according to claim 1, comprising:
a flushing portion configured to receive the liquid ejected from the head; and
a waste liquid tank configured to store the liquid received by the flushing portion, wherein
the flushing portion is disposed at a position not overlapping the medium support unit in an intersecting direction intersecting the support surface, and
the waste liquid tank is disposed at a position overlapping the flushing portion in the intersecting direction.

8. The printing apparatus according to claim 7, comprising:
a wiping portion configured to wipe a nozzle surface of the head, wherein
the wiping portion is disposed at a position not overlapping the medium support unit in the intersecting direction, and
the waste liquid tank is disposed at a position overlapping the wiping portion in the intersecting direction.

9. A printing apparatus comprising:
a medium support unit having a support surface supporting at least a printing region of a medium;
a medium accommodation unit configured to accommodate a region, of the medium, not supported by the support surface;
a head configured to eject a liquid onto the medium supported by the support surface; and
a head moving unit configured to move the head, wherein
the medium support unit is configured not to move in a direction parallel to the support surface,
the head moving unit moves the head in a direction parallel to the support surface,
the head moving unit includes a first head moving unit and a second head moving unit,
the first head moving unit moves the head in a first direction parallel to the support surface, and
the second head moving unit moves the head in a second direction parallel to the support surface and intersecting the first direction.

10. The printing apparatus according to claim 9, wherein
the medium support unit includes a position adjustment unit configured to adjust a position of the support surface in an intersecting direction intersecting the support surface.

11. The printing apparatus according to claim 9, comprising:
a housing, wherein
the head moving unit is accommodated in the housing.

12. The printing apparatus according to claim 11, wherein
the housing includes a first surface parallel to the support surface, an opening provided at least at the first surface, and an opening/closing cover configured to open and close the opening, and
the opening has a shape longer than the support surface in a predetermined direction parallel to the first surface, when viewed from an intersecting direction intersecting the support surface.

13. The printing apparatus according to claim 11, wherein
the housing includes a first surface parallel to the support surface, a second surface intersecting the first surface, an opening provided across at least the first surface and the second surface, and an opening/closing cover configured to open and close the opening, and
the opening has a shape that is longer than the support surface in a direction parallel to the first surface and parallel to the second surface, when viewed from an intersecting direction intersecting the support surface.

14. The printing apparatus according to claim 9, comprising:
a flushing portion configured to receive the liquid ejected from the head; and
a waste liquid tank configured to store the liquid received by the flushing portion, wherein
the flushing portion is disposed at a position not overlapping the medium support unit in an intersecting direction intersecting the support surface, and the waste liquid tank is disposed at a position overlapping the flushing portion in the intersecting direction.

15. The printing apparatus according to claim 14, comprising:

a wiping portion configured to wipe a nozzle surface of the head, wherein the wiping portion is disposed at a position not overlapping the medium support unit in the intersecting direction, and the waste liquid tank is disposed at a position overlapping the wiping portion in the intersecting direction.

16. A printing apparatus comprising:

a medium support unit having a support surface supporting at least a printing region of a medium;

a medium accommodation unit configured to accommodate a region, of the medium, not supported by the support surface;

a head configured to eject a liquid onto the medium supported by the support surface;

a head moving unit configured to move the head:

a flushing portion configured to receive the liquid ejected from the head; and a waste liquid tank configured to store the liquid received by the flushing portion, wherein the medium support unit is configured not to move in a direction parallel to the support surface, the head moving unit moves the head in a direction parallel to the support surface, the flushing portion is disposed at a position not overlapping the medium support unit in an intersecting direction intersecting the support surface, and the waste liquid tank is disposed at a position overlapping the flushing portion in the intersecting direction.

17. The printing apparatus according to claim 16, wherein the medium support unit includes a position adjustment unit configured to adjust a position of the support surface in an intersecting direction intersecting the support surface.

18. The printing apparatus according to claim 16, comprising:

a housing, wherein the head moving unit is accommodated in the housing.

19. The printing apparatus according to claim 18, wherein the housing includes a first surface parallel to the support surface, an opening provided at least at the first surface, and an opening/closing cover configured to open and close the opening, and the opening has a shape longer than the support surface in a predetermined direction parallel to the first surface, when viewed from an intersecting direction intersecting the support surface.

20. The printing apparatus according to claim 18, wherein the housing includes a first surface parallel to the support surface, a second surface intersecting the first surface, an opening provided across at least the first surface and the second surface, and an opening/closing cover configured to open and close the opening, and the opening has a shape that is longer than the support surface in a direction parallel to the first surface and parallel to the second surface, when viewed from an intersecting direction intersecting the support surface.

* * * * *